United States Patent
Ueda et al.

(10) Patent No.: US 8,708,641 B2
(45) Date of Patent: Apr. 29, 2014

(54) TURBINE BLADE AND GAS TURBINE

(75) Inventors: Osamu Ueda, Hyogo (JP); Hiroyuki Hamana, Hyogo (JP); Naoyuki Seki, Hyogo (JP); Kenichi Arase, Hyogo (JP); Katsuhisa Shigemoto, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 490 days.

(21) Appl. No.: 13/058,439

(22) PCT Filed: Sep. 24, 2009

(86) PCT No.: PCT/JP2009/066515
§ 371 (c)(1),
(2), (4) Date: Feb. 10, 2011

(87) PCT Pub. No.: WO2010/073783
PCT Pub. Date: Jul. 1, 2010

(65) Prior Publication Data
US 2011/0135479 A1     Jun. 9, 2011

(30) Foreign Application Priority Data

Dec. 25, 2008  (JP) ................................ 2008-330612
Dec. 25, 2008  (JP) ................................ 2008-330613
Dec. 25, 2008  (JP) ................................ 2008-330614

(51) Int. Cl.
*F01D 5/00*     (2006.01)

(52) U.S. Cl.
USPC ................................ 415/1; 415/119; 416/215

(58) Field of Classification Search
USPC .............. 415/119, 1; 416/190, 191, 500, 215, 416/218, 204 R
See application file for complete search history.

(56) References Cited

U.S. PATENT DOCUMENTS 3,966,353 A   6/1976  Booher, Jr. et al.
4,897,021 A * 1/1990  Chaplin et al. ............. 415/173.7
(Continued)

FOREIGN PATENT DOCUMENTS

EP   1 441 108 A2    7/2004
JP   46-17327 B1     5/1971
(Continued)

OTHER PUBLICATIONS

International Search Report of PCT/JP2009/066515, date of mailing Dec. 15, 2009.
(Continued)

*Primary Examiner* — Edward Look
*Assistant Examiner* — Juan G Flores
(74) *Attorney, Agent, or Firm* — Westerman, Hattori, Daniels & Adrian, LLP

(57) ABSTRACT

Provided are turbine blades and a gas turbine capable of damping the vibrations caused by an excitation force and facilitating mounting/disassembly. Included are a shroud portion disposed at an end portion of an airfoil portion; a holder casing that can slide relative to the shroud portion, that can also be attached thereto/detached therefrom, and that forms a space with the shroud portion therebetween; and an elastic portion that is disposed in the space, that biases the shroud portion in a direction that separates it from the holder casing, and is disposed in a movable manner relative to the shroud portion; and a pressing portion that is disposed between the elastic portion and the holder casing and that can be moved toward and away from the shroud portion.

21 Claims, 13 Drawing Sheets

(56) References Cited

U.S. PATENT DOCUMENTS

| | | | |
|---|---|---|---|
| 5,269,651 A * | 12/1993 | Ostermeir et al. | 415/209.1 |
| 5,346,362 A | 9/1994 | Bonner et al. | |
| 5,429,479 A | 7/1995 | Cordier | |
| 2006/0171812 A1 * | 8/2006 | Albrecht et al. | 416/190 |

FOREIGN PATENT DOCUMENTS

| | | | |
|---|---|---|---|
| JP | 46-037048 B | | 10/1971 |
| JP | 2-23204 A | | 1/1990 |
| JP | 4-082425 U | | 7/1992 |
| JP | 6-346703 A | | 12/1994 |
| JP | 11-102774 A | | 4/1999 |
| JP | 2002-276304 A | | 9/2002 |
| JP | 2004-011434 A | | 1/2004 |
| JP | 2006-056151 A | | 3/2006 |
| WO | 2006/109392 A1 | | 10/2006 |

OTHER PUBLICATIONS

Korean Decision to Patent a Grant dated Mar. 25, 2013, issued in corresponding Korean Patent Application No. 10-2011-7003743.
European Search Report dated May 9, 2012, issued in corresponding application No. 09834589.5.
Office Action dated Feb. 12, 2014, issued in corresponding Japanese application No. 2008-330612, w/ English translation.
Office Action dated Feb. 12, 2014, issued in corresponding Japanese application No. 2008-330613, w/ English translation.
Office Action dated Feb. 12, 2014, issued in corresponding Japanese application No. 2008-330614, w/ English translation.

* cited by examiner

TURBINE BLADE AND GAS TURBINE

TECHNICAL FIELD

The present invention relates to turbine blades and gas turbines.

BACKGROUND ART

Cantilever stator blades in which shrouds are provided as separate pieces, shrouded stator blades in which shrouds are integrally provided, and so on, are typically employed as stator blades of gas turbine compressors.

With the shrouded stator blades, leakage of air, etc. is less likely to occur at tips of airfoil portions thereof as compared with the cantilever stator blades and, in addition, a rotor seal structure that suppresses leakage of air, etc. between the stator blades and the rotor can be provided at the inner circumferences of the shrouds. This allows the shrouded stator blades to reduce the air leakage level to an appropriate amount; therefore, they are considered advantageous in terms of performance.

In the above-described shrouded stator blades, circumferential base portions referred to as shroud portions are provided at outer and inner end portions of the airfoil portions (profile portions).

Examples of methods for securing the airfoil portions to the shroud portions include the tenon-type securing method, in which insertion portions protruding from the airfoil portions are inserted into insertion openings provided in the shroud portions, and the pork-chop-type securing method, in which insertion-flange portions formed in a widening shape from the airfoil portions are inserted into the above-described insertion openings.

With the tenon-type securing method or the pork-chop-type securing method, the insertion portions or the insertion-flange portions may be secured by mechanically inserting them into the insertion openings, or they may be secured by brazing or welding. The shroud portions of the stator blades are assembled into a ring shape in this way.

In addition, in some cases, the airfoil portions and the shroud portions are molded or machined as an integral structure.

In order to absorb thermal expansion in the circumferential directions in a ring-shaped assembled state, to enhance the ease of machining and assembly of the shroud portions, and to achieve enhanced ease of maintenance for the shroud portions, etc., the shroud portions are typically divided into a plurality of portions in the circumferential direction. For example, in the case of the shrouded stator blades, the shroud portions are divided in correspondence with each stator blade.

Furthermore, a seal structure, such as a labyrinth seal, a honeycomb seal or the like, is provided between the shroud portions and a rotating rotor shaft (for example, see Patent Literature 1).

In consideration of the ease of machining or the ease of repairing, the configuration of the seal structure may be such that the seal structure is formed as a separate structure from the airfoil portions or the shroud portions, wherein the seal structure is combined with the airfoil portions or the shroud portions after being formed.

In addition to the structure disclosed in Patent Literature 1, examples of configurations in which the shroud portions are combined with the seal structure include a configuration in which a seal structure is fitted to groove structures provided in shroud portions.

On the other hand, in a flow field of air or gas inside a compressor of a gas turbine, it is known that when stator blades receive an excitation force having a frequency matching the natural frequency of the stator blades or a frequency that is an integral multiple of the rotation speed, the airfoil portions and the shroud portions of the stator blades exhibit large vibrations (exhibit a vibration response).

Examples of the above-described excitation force include the excitation force of a wake flow (wake) of rotating rotor blades, the excitation force of an interference flow (potential), and so forth.

When the stress that acts on the stator blades caused by the above-described vibration response increases, exceeding the fatigue resistance of materials that constitute the stator blades, fatigue cracks may form in the stator blades, and the stator blades may be broken due to the fatigue cracks.

Because of this, it is necessary to design the airfoil portions and the shroud portions so as to have physical-frame strength that prevents fatigue crack formation even if the vibration response occurs, and the natural frequency of the stator blades also needs to be shifted, in other words, detuned, from the excitation frequency that is expected to act on the stator blades.

On the other hand, along with increases in output power, enhancement of performance, and reduction of costs in gas turbines in recent years, the size of profile portions is being increased, including enlargement of the blade profile width (blade chord), enlargement of the blade length (span), and so forth in the profile portions.

When the profile portions are increased in size in this way, the aerodynamic force or force of gas that acts on the airfoil portions increases, and the load or moment that acts on base portions of the airfoil portions, in other words, connection portions between the airfoil portions and the shroud portions, increases. In order to endure such increases in load or moment, sufficient strength needs to be ensured by increasing the radial size of the radius of curvature R of fillets formed at the base portions of the airfoil portions.

With regard to this, in contrast to ensuring sufficient strength at the base portions of the airfoil portions, there is a demand from an aerodynamic standpoint, that it is preferred to reduce the radial size of the radius of curvature R of the fillets formed at the base portions of the airfoil portions.

The profile portions compress gas-containing air, etc. by being rotationally driven, and, on the other hand, receive air (containing gas) resistance in the flow field. Therefore, in order to decrease this air resistance, the profile shape is optimized, the leading-edge diameter and trailing-edge diameter in the profile portions are decreased in the radial sizes thereof, and the airfoil thickness itself is reduced.

However, the above-described reduction of the radial size or thickness is a factor that decreases the strength of the stator blades, in particular the strength against a resonant response. Accordingly, with regard to designs of the profile portions, there are restrictions on the above-described reduction of the radial size or thickness in order to ensure the strength of the profile portions.

In addition, in order to prevent the stator blades from breaking through resonating with the excitation force, the natural frequency of a stator-blade ring as a whole, in which a plurality of stator blades are combined, is shifted from the frequency of the excitation source; that is, detuning design is conducted so that the frequencies do not match.

However, because the above-described natural frequency depends on the shape of the profile portions, the shape of the shroud portions, and so forth, when detuning between the natural frequency and the frequency of the excitation source is given priority, the stator blades in many cases are inevitably designed at the expense of the aerodynamic characteristics of the stator blades.

Patent Literature 1 proposes a technique of pressing the stator blades with wave-shaped plate springs in order to restrict the relative movement of the stator blades.

Furthermore, in order to reduce the vibration response in the stator blades, there is also a known technique for damping vibrations due to the vibration response in the stator blades by vibration damping (damping) which uses a frictional force using springs.

More specifically, a known structure damps vibrations in the stator blades with a structure in which doughnut-ring shaped springs are inserted between a shroud ring that is disposed on an inner circumferential side and a seal holder that holds a seal, pressing the springs against the shroud rings.

By doing so, when the shroud portions articulated with the profile portions vibrationally deform due to resonance, the shroud portions and the springs slide, and a frictional force acts between the shroud portions and the springs. Consequently, vibrational energy is converted into frictional energy (thermal energy) at the sliding surfaces between the shroud portions and the springs, thus damping the vibrations of the stator blades.

CITATION LIST

Patent Literature

{PTL 1} Japanese Unexamined Patent Application, Publication No. 2002-276304.

SUMMARY OF INVENTION

Technical Problem

However, when physical frames of blades such as stator blades increase in size, the vibrational energy associated with vibrations also relatively increases; therefore, it is also necessary to increase the damping force in a mechanism for damping the vibrations in the stator blades. For example, in the case of the above-described structure in which the springs are pressed against the shroud rings, it is necessary to increase the spring force in order to obtain sufficient damping force due to friction.

When the seal holder ring and the shroud ring are assembled with a runner guided structure under such circumstances, there is a problem in that assembly or disassembly of the seal holder ring and the shroud rings becomes difficult.

That is, the expanding force of the above-described spring acts between the seal holder ring and the shroud rings, and a frictional force also acts between the springs and the seal holder ring or between the springs and the shroud rings; therefore, there is a problem of increasing force required when the seal holder ring and the shroud rings slide, making assembly or disassembly thereof difficult.

In addition, with the configuration disclosed in Patent Literature 1, because the structure does not consider the above-described spring replacement, there is a problem in that, when the springs become deteriorated due to wear from long-term use, it is difficult to replace the springs whose spring force is increased as described.

The present invention is for solving the above-described problems and provides a turbine blade and a gas turbine that are capable of damping vibrations caused by an excitation force and that are capable of facilitating mounting or disassembly of a seal holder ring and a shroud ring and replacement of an elastic member, such as a spring.

Solution to Problem

In order to achieve the above-described object, the present invention provides the following solutions.

Turbine blades according to a first aspect of the present invention include a shroud portion disposed at an end portion of an airfoil portion; a holder casing that can slide relative to the shroud portion, that can also be attached thereto/detached therefrom, and that forms a space with the shroud portion therebetween; and an elastic portion that is disposed in the space, biases the shroud portion in a direction that separates it from the holder casing, and is disposed in a movable manner relative to the shroud portion.

With the turbine blades according to the first aspect of the present invention, when the airfoil portions and the shroud portions vibrate and slide relative to the holder casing, the elastic portions, which have been pressing the shroud portions in the direction away from the holder casing, and the shroud portions relatively move; that is, the elastic portions and shroud portions slide. Accordingly, energy associated with vibrations in the airfoil portions and the shroud portions is converted into thermal energy (frictional energy) due to sliding, thereby damping the vibrations in the airfoil portions and the shroud portions. In addition, the elastic portions are moved by sliding together with the holder casing to be attached to/detached from the shroud portions, and thereby, the elastic portions can easily be replaced.

With the above-described turbine blades according to the first aspect, it is desirable that the configuration thereof be such that the shroud portion is independently disposed for each of a plurality of the airfoil portions, and, for a plurality of the shroud portions, a single holder casing is configured in an attachable/detachable manner.

With this configuration, because the shroud portions are independently disposed for each of the plurality of the airfoil portions, the individual airfoil portions and the shroud portions readily move relative to the elastic portions, as compared with the case in which the plurality of the shroud portions are integrally formed. In other words, the sliding distance between the shroud portions and the elastic portions is extended.

Accordingly, a greater amount of energy associated with the vibrations in the airfoil portions and the shroud portions is converted into thermal energy (frictional energy) due to sliding, and therefore, the vibrations in the airfoil portions and the shroud portions are more readily damped.

With the above-described turbine blades according to the first aspect, the configuration thereof may be such that the elastic portion extends parallel to the direction in which the plurality of the shroud portions form a row and is a plate spring formed in substantially a wave shape, and peak portions of the plate spring are in contact with the shroud portion or the holder casing.

With this configuration, by employing the plate springs formed into a wave-like shape as the elastic portions, a larger pressing force can be exerted on the shroud portions as compared with the case in which other types of springs are employed.

In addition, by making each of the peak portions of the plate springs individually contact the shroud portions, the plurality of the shroud portions can be moved, by sliding them, with respect to a single plate spring.

With the turbine blades according to the first aspect, the configuration thereof may further include a pressing portion that is disposed between the elastic portion and the holder casing and that can be moved toward and away from the shroud portion.

With this configuration, because the compression level of the elastic portions is adjusted by moving the pressing portion closer to the shroud portions, the force with which the elastic portions press the shroud portions is adjusted. In other words, because the frictional force between the elastic portions and the shroud portions is adjusted, the level of damping of vibrations in the airfoil portions and the shroud portions is adjusted.

In addition, by moving the pressing portion closer to the shroud portions, the biasing force of the elastic portions is received by the shroud portions and the pressing portion. In other words, the biasing force of the elastic portions does not act on the holder casing. Accordingly, when moving the holder casing by sliding it relative to the shroud portions or when attaching/detaching the holder casing, the frictional force that acts at contact surfaces between the shroud portions and the holder casing is reduced, thereby making it possible to facilitate the sliding movement or attaching/detaching.

With the above-described turbine blades according to the first aspect, the configuration thereof may be such that a single pressing portion is disposed in the space formed by the plurality of the shroud portions and the single holder casing.

With this configuration, because a single holder casing is provided for the plurality of the airfoil portions and the shroud portions, the sealing level between the upstream side and the downstream side of the turbine blades is increased, as compared with the case in which the holder casings are disposed for each of the plurality of the airfoil portions and the shroud portions.

With the above-described turbine blades according to the first aspect, the configuration thereof may be such that the elastic portion extends parallel to the direction in which the plurality of the shroud portions form a row and is a plate-like spring formed in substantially a wave shape, and peak portions of the spring are in contact with the shroud portions or the pressing casing.

With this configuration, by employing plate-like springs formed into a wave-like shape as the elastic portions, a larger pressing force can be exerted on the shroud portions as compared with the case in which other types of springs are employed.

In addition, by making each of the peak portions of the springs individually contact the shroud portions, the plurality of the shroud portions can be moved, by sliding, with respect to a single spring.

With the above-described turbine blades according to the first aspect, the configuration thereof may be such that a plurality of the springs are disposed in substantially parallel rows and, relative to peak portions of the first spring, peak portions of the other spring are disposed shifted therefrom.

With this configuration, it is possible to make the springs contact all of the shroud portions, even when arrangement intervals of the peak portions in the first spring are wider than arrangement intervals of the shroud portions. That is, the shroud portions with which the peak portions of the first spring are not in contact are in contact with the peak portions of the other spring, thereby making it possible to have all of the shroud portions in contact with the springs.

With the above-described turbine blades according to the first aspect, the configuration thereof may be such that the pressing portion is provided with a compressing portion that compresses the elastic portion by moving the pressing portion closer to the shroud portion.

With this configuration, the pressing portion can be moved closer to the shroud portions using the compressing portions. Accordingly, the compression level of the elastic portions is adjusted, thereby adjusting the force with which the elastic portions press the shroud portions. In other words, because the frictional force between the elastic portions and the shroud portions is adjusted, it is possible to adjust the level of damping of vibrations in the airfoil portions and the shroud portions.

In addition, by moving the pressing portion closer to the shroud portions, the biasing force of the elastic portions is received by the shroud portions and the pressing portion. Accordingly, when moving the holder casing by sliding it relative to the shroud portions or when attaching/detaching the holder casing, the frictional force that acts at contact surfaces between the shroud portions and the holder casing is reduced, thereby making it possible to facilitate the sliding movement or attaching/detaching.

Turbine blades according to a second aspect of the present invention include a shroud portion disposed at an end portion of an airfoil portion; a holder casing that can be moved by sliding relative to the shroud portion, that can also be attached thereto/detached therefrom, and that forms a space with the shroud portions therebetween; an elastic portion that is disposed in the space and that biases the shroud portion in a direction that separates it from the holder casing; and a friction portion that is disposed between the elastic portion and the shroud portion, that can be moved closer to/away from the shroud portion, and that is disposed in a movable manner relative to the shroud portion.

With the turbine blades according to the second aspect, when the airfoil portions and the shroud portions vibrate and slide relative to the holder casing, the friction portions, which have been pressed against the shroud portions by the elastic portions, and the shroud portions relatively move; that is, the friction portions and shroud portions slide. Accordingly, energy associated with vibrations of the airfoil portions and the shroud portions is converted into thermal energy (frictional energy) due to sliding, thereby damping the vibrations in the airfoil portions and the shroud portions.

On the other hand, by moving the friction portions closer to the holder casing, the biasing force of the elastic portions is received by the friction portions and the holder casing. In other words, the biasing force of the elastic portions does not act on the shroud portions. Accordingly, when moving the holder casing by sliding it relative to the shroud portions or when attaching/detaching the holder casing, the frictional force that acts at contact surfaces between the shroud portions and the holder casing is reduced, thereby making it possible to facilitate the sliding movement or attaching/detaching.

With the above-described turbine blades according to the second aspect, it is desirable that the configuration thereof be such that the shroud portion is independently disposed for each of a plurality of the airfoil portions; for a plurality of the shroud portions, a single holder casing be configured in a attachable/detachable manner; and, in the space formed by the plurality of the shroud portions and the single holder casing, a single friction portion be disposed for a single shroud portion.

With this configuration, because the shroud portions are independently disposed for each of the plurality of the airfoil portions, the individual airfoil portions and the shroud portions readily move relative to the friction portions, as compared with the case in which the plurality of the shroud portions are integrally formed. In other words, the sliding distance between the shroud portions and the friction portions is extended.

Accordingly, a greater amount of energy associated with the vibrations in the airfoil portions and the shroud portions is converted into thermal energy (frictional energy) due to sliding, and therefore, the vibrations in the airfoil portions and the shroud portions are more readily damped.

On the other hand, because a single holder casing is provided for the plurality of the airfoil portions and the shroud portions, the sealing level between the upstream side and the downstream side of the turbine blades is increased as compared with the case in which the holder casings are disposed for each of the plurality of the airfoil portions and the shroud portions.

With the above-described turbine blades according to the second aspect, it is desirable that the configuration thereof be such that the elastic portion extends parallel to the direction in which the plurality of the shroud portions form a row and is a plate-like spring formed in substantially a wave shape, and peak portions of the spring are in contact with the friction portion or the pressing portion.

With this configuration, by employing springs formed into a wave-like shape as the elastic portions, a larger pressing force can be exerted on the shroud portions as compared with the case in which other types of springs are employed.

On the other hand, by making each of the peak portions of the springs individually contact the shroud portions, the plurality of the friction portions are pressed against the shroud portions by a single spring.

With the above-described turbine blades according to the second aspect, it is desirable that the configuration thereof be such that the friction portion is provided with a compressing portion that extends from the friction portion toward the holder casing, protrudes so as to penetrate the holder casing, and compresses the elastic portion by moving the friction portion closer to the holder casing.

With this configuration, because the compressing portions protrude from the friction portions penetrating the holder casing, the compressing portions and the friction portions are movable in directions toward and away from the holder casing, while being restricted in movement in the direction that intersects with the direction of movement toward and away from the holder casing. Accordingly, it is ensured that sliding occurs between the shroud portions and the friction portions.

With the above-described turbine blades according to the second aspect, it is desirable that the configuration thereof be such that a relief groove that extends in a direction that intersects with the direction into which the holder casing slides is provided at a surface where the friction portion comes in contact with the shroud portion.

With this configuration, by providing the relief grooves, the surfaces of the friction portions that come into contact with the shroud portions are divided into two with the relief grooves therebetween, and each surface comes into contact with the shroud portions. Accordingly, even if the shroud portions and the friction portions slide, the shroud portions and the friction portions come into stable contact at the above-described two surfaces, thereby preventing the occurrence of problems such as partial contact or the like.

A gas turbine according to the present invention includes any of the above-described turbine blades.

With the gas turbine according to the present invention, because the turbine blades of this embodiment are provided, energy associated with the vibrations of the airfoil portions and the shroud portions of the turbine blades is converted into thermal energy (frictional energy) due to sliding, thereby damping the vibrations in the airfoil portions and the shroud portions.

With a gas turbine provided with the turbine blades according to the above-described first aspect, when moving the holder casing by sliding it relative to the shroud portions or when attaching/detaching the holder casing, the frictional force that acts at contact surfaces between the shroud portions and the holder casing is reduced by moving the pressing portion closer to the shroud portions, thereby making it possible to facilitate the sliding movement or attaching/detaching.

With a gas turbine provided with the turbine blades according to the above-described second aspect, when moving the holder casing by sliding it relative to the shroud portions or when attaching/detaching the holder casing, the frictional force that acts at contact surfaces between the shroud portions and the holder casing is reduced by moving the friction portions closer to the holder casing, thereby making it possible to facilitate the sliding movement or attaching/detaching.

Advantageous Effects of Invention

With the turbine blades and the gas turbine according to the first aspect of the present invention, because the elastic portions, which have been pressing the shroud portions in the direction away from the holder casing and the shroud portions relatively move, that is, the elastic portions and shroud portions slide, energy associated with vibrations in the airfoil portions and the shroud portions is converted into thermal energy (frictional energy) due to sliding. As a result, an advantage is afforded in that the vibrations in the airfoil portions and the shroud portions can be damped.

In addition, an advantage is afforded in that, by moving the pressing portion closer to the shroud portions, the biasing force of the elastic portions is received by the shroud portions and the pressing portion; therefore, the frictional force exerted on contact surfaces between the shroud portions and the holder casing is reduced when moving the holder casing by sliding it relative to the shroud portions or when attaching/detaching the holder casing, and thus, mounting and disassembling can be facilitated.

In addition, an advantage is afforded in that the elastic portions can be easily replaced by attaching them to or detaching them from the shroud portions through moving the elastic portions by sliding them together with the holder casing.

With the turbine blades and the gas turbine according to the second aspect of the present invention, an advantage is afforded in that, because the friction portions and the shroud portions slide, the energy associated with the vibrations in the airfoil portions and the shroud portions is converted into thermal energy (frictional energy) due to sliding, thereby damping the vibrations in the airfoil portions and the shroud portions.

In addition, an advantage is afforded in that, by moving the friction portions closer to the holder casing, the biasing force of the elastic portions is received by the friction portions and the holder casing; therefore, the frictional force exerted at contact surfaces between the shroud portions and the holder casing is reduced when moving the holder casing by sliding relative to the shroud portions or when attaching/detaching the holder casing, and thus, it is possible to facilitate the sliding movement or attaching/detaching.

DESCRIPTION OF EMBODIMENTS

Figure 1:
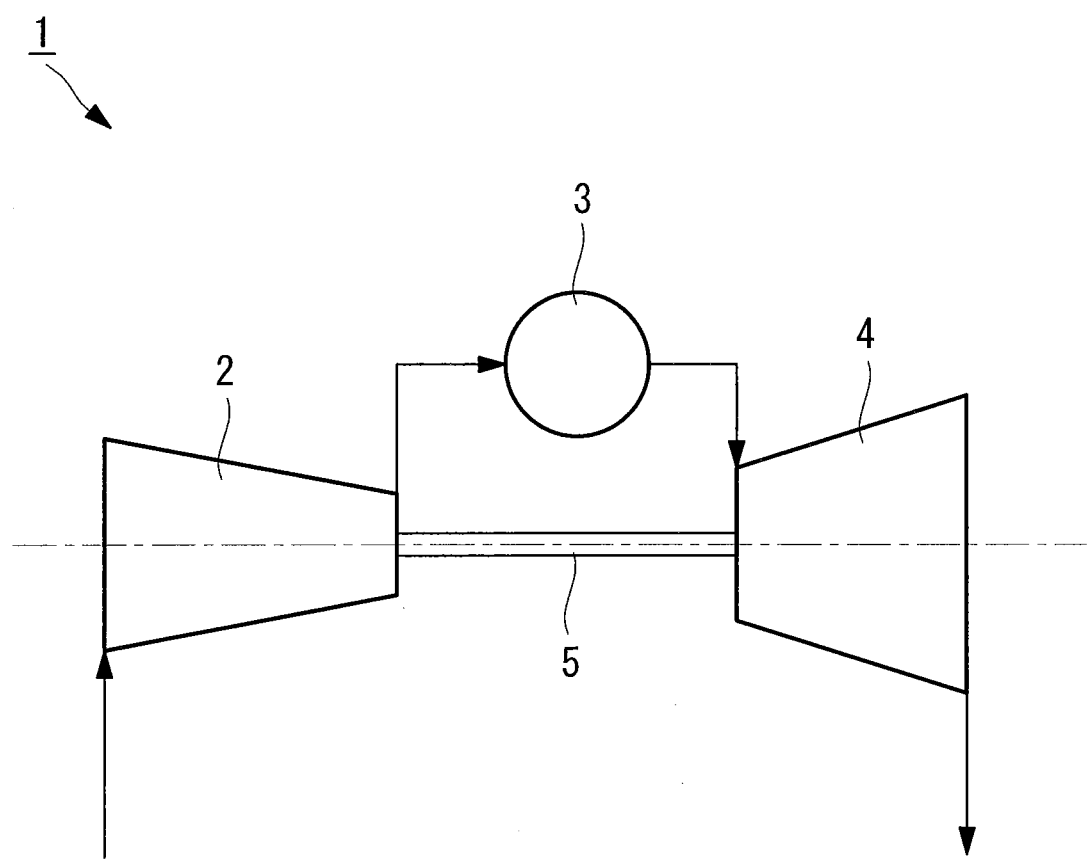
FIG. 1 is a schematic diagram for explaining the configuration of gas turbines according to first to third embodiments of the present invention.

FIG. 1 is a schematic diagram for explaining the configuration of gas turbines according to first to third embodiments of the present invention described below.

As shown in FIG. 1, a gas turbine 1 is provided with a compressor 2, a combustor 3, a turbine unit 4, and a rotational shaft 5.

As shown in FIG. 1, the compressor 2 sucks in air to compress it and supplies the compressed air to the combustor 3. A rotational driving force is transmitted from the turbine unit 4 to the compressor 2 via the rotational shaft 5, and, upon being rotationally driven, the compressor 2 sucks in air and compresses it.

Note that any known configurations can be employed for the compressor 2; it is not particularly limited.

As shown in FIG. 1, the combustor 3 mixes externally supplied fuel and the supplied compressed air, generates high-temperature gas by combusting the mixed air, and supplies the generated high-temperature gas to the turbine unit 4.

Note that any known combustors can be employed as the combustor 3; it is not particularly limited.

As shown in FIG. 1, the turbine unit 4 extracts rotational driving force from the supplied high-temperature gas to rotationally drive the rotational shaft 5.

Note that any known configurations can be employed for the turbine unit 4; it is not particularly limited.

{First Embodiment}

A gas turbine according to a first embodiment of the present invention will now be described with reference to FIGS. 1 to 7. Note that, in this embodiment, turbine blades of the invention of the present application will be described as applied to stator blades of sixth to ninth stages in the compressor 2 of the gas turbine 1.

Figure 2:
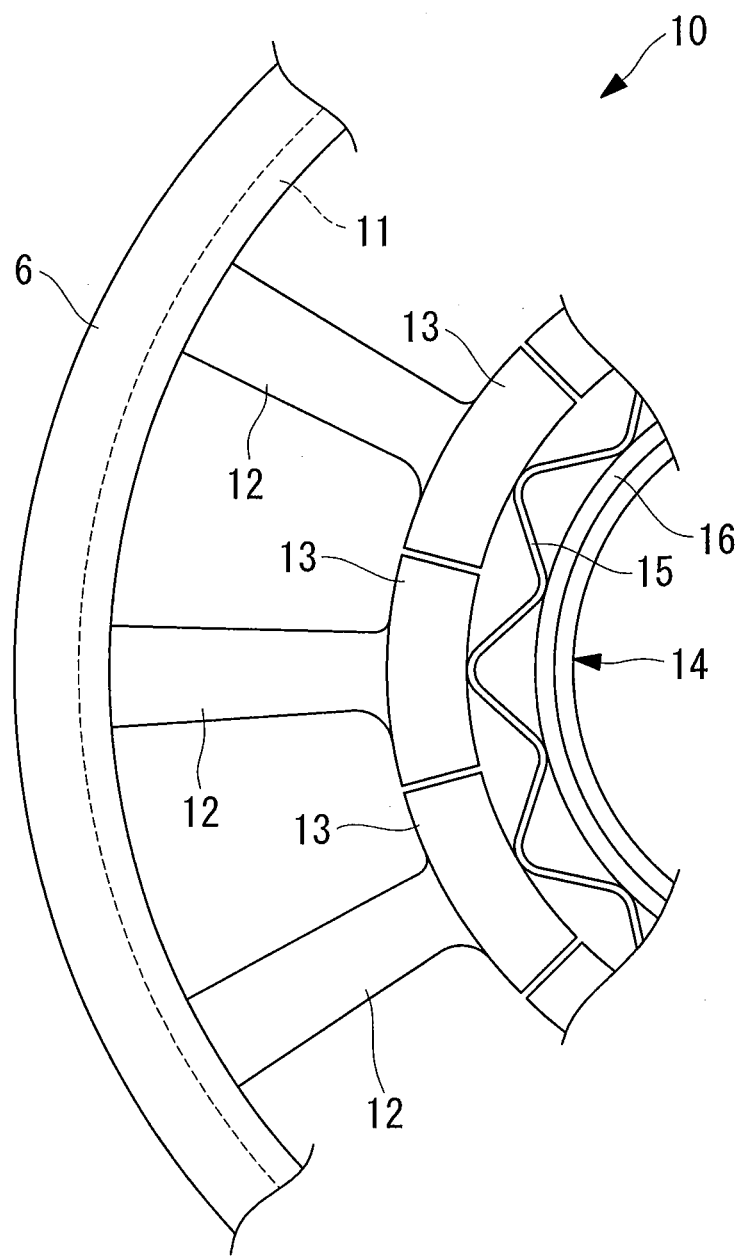
FIG. 2 is a schematic diagram for explaining the configuration of a rotor disc and stator blades in a compressor of a gas turbine according to the first embodiment of the present invention.

FIG. 2 is a schematic diagram for explaining the configuration of a rotor disc and stator blades in a compressor of a gas turbine according to this embodiment.

As shown in FIGS. 1 and 2, the compressor 2 is provided with stator blades (turbine blades) 10 that are attached to a casing 6 of the gas turbine 1 and rotor blades that are disposed at a circumferential surface of a circular plate-shaped rotor disc (not shown) which is rotationally driven by the rotational shaft 5.

The stator blades 10 and the rotor blades are disposed in rows in the circumferential direction of the rotational shaft 5 at regular intervals and are disposed in alternating rows in the axial direction of the rotational shaft 5.

Next, the stator blades 10, which are the feature of this embodiment, will be described.

Figure 3:
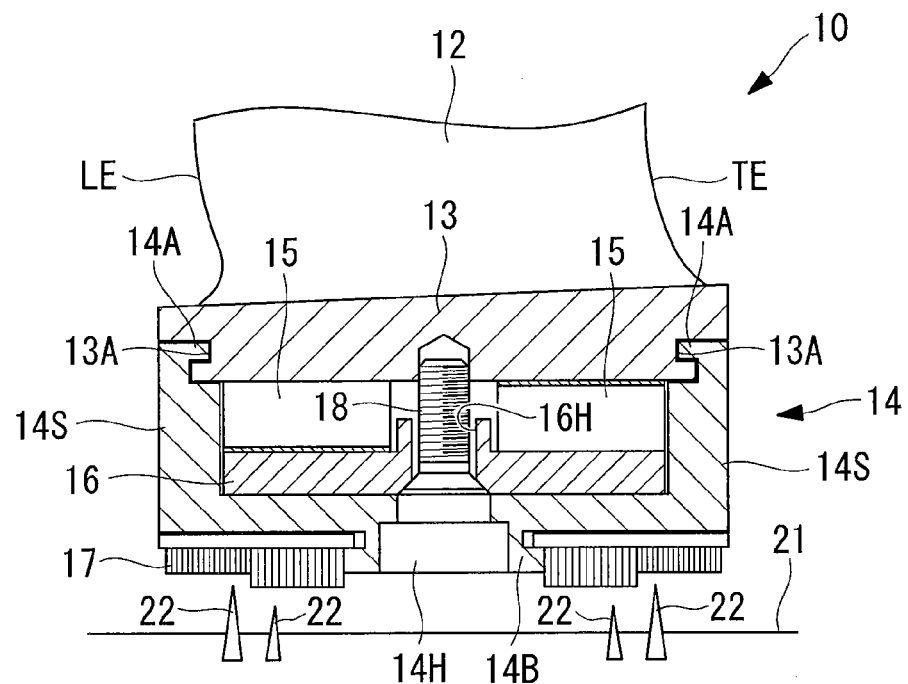
FIG. 3 is a cross-sectional view for explaining the configuration near a seal holder in the stator blades in FIG. 2.

FIG. 3 is a cross-sectional view for explaining the configuration near a seal holder in the stator blade in FIG. 2.

As shown in FIGS. 2 and 3, the stator blades 10 are provided with an outer shroud portion 11, airfoil portions 12, inner shroud portions (shroud portions) 13, a seal holder (holder casing) 14, springs (elastic portions) 15, a spacer (pressing portion) 16, and a honeycomb seal 17.

As shown in FIG. 2, the outer shroud portion 11 is a member that forms part of wall surfaces of a flow channel in which fluid flows in the compressor 2. Furthermore, the outer shroud portion 11 is a curved plate-like member disposed at end portions of the airfoil portions 12 on the radially outer side thereof, and a single outer shroud portion 11 is disposed for a plurality of the airfoil portions 12. In other words, the outer shroud portion 11 is formed of a cylindrical member that has been divided into a plurality of portions, and the plurality of the airfoil portions 12 are connected to an inner circumferential surface thereof.

With regard to the shape of the outer shroud portion 11 and the connection method with the airfoil portions 12, any known shapes and methods can be employed; they are not particularly limited.

As shown in FIG. 2, the airfoil portions 12 are members whose cross-sections extending in the radial direction of the rotational shaft 5 are formed in airfoil shapes and that, together with the rotor blades rotationally driven by the rotational shaft 5, compress a fluid, such as air, and send it toward the combustor 3.

The airfoil portions 12 are provided with leading edges LE, which are upstream-end portions relative to a flow of surrounding fluid, trailing edges TE, which are downstream-end portions, negative pressure surfaces, which are surfaces curved in convex shapes, and positive pressure surfaces, which are curved in concave shapes.

As shown in FIGS. 2 and 3, the inner shroud portions 13, as well as the outer shroud portion 11, form part of the flow channel in which the fluid flows inside the compressor 2. Furthermore, the inner shroud portions 13 are curved plate-like members disposed at end portions of the airfoil portions 12 on the radially inner side thereof, and a single inner shroud portion 13 is disposed for a single airfoil portion 12. In other words, the inner shroud portions 13 are formed of a cylindrical member that has been divided into a plurality of portions, and the airfoil portions 12 are connected to outer circumferential surfaces thereof.

Fitting grooves 13A that fit with the seal holder 14, extending in the circumferential direction (direction perpendicular to the plane of the drawing in FIG. 3), are provided at end portions on the leading edge LE side and trailing edge TE side of the inner shroud portions 13.

As shown in FIG. 3, the seal holder 14 is a member that is attached to the inner shroud portions 13 on the inner circumferential side thereof (bottom side in FIG. 3), that, together with the inner shroud portions 13, forms a space for accommodating the springs 15 and the spacer 16 inside thereof, and that supports the honeycomb seal 17.

As with the outer shroud portion 11, a single seal holder 14 is disposed for the plurality of the airfoil portions 12 and the inner shroud portions 13.

The seal holder 14 is provided with a pair of side wall portions 14S that extend in radial directions at the leading edge LE side and the trailing edge TE side and a bottom plate portion 14B which connects end portions of the pair of side wall portions 14S at the radially inner side thereof.

In other words, a groove portion is formed in the seal holder 14, opening outward in the circumferential direction (top side in FIG. 3).

The radially outer-side end portions of the side wall portions 14S are provided with protrusions 14A which protrude inward in the seal holder 14, extending in the circumferential direction thereof, and fit with the fitting grooves 13A of the inner shroud portions 13.

The bottom plate portion 14B is provided with through-holes 14H into which compressing bolts (compressing portions) 18 that press the spacer 16 together with the springs 15 are inserted. The through-holes 14H are provided in the bottom plate portion 14B at an equidistant position from each of the pair of side wall portions 14S, and a plurality thereof are provided in the circumferential direction (direction perpendicular to the plane of the drawing in FIG. 3) at predetermined intervals.

As shown in FIGS. 2 and 3, the springs 15 are elastic members that bias the inner shroud portions 13 in directions that separate them from the spacer 16 and the seal holder 14. Furthermore, by sliding on the inner shroud portions 13, the springs 15 damp the vibrations in the stator blades 10, i.e., the airfoil portions 12 and the inner shroud portions 13.

In this way, by having the springs 15 bias the inner shroud portions 13 in the directions that separate them from the seal holder 14, the fitting grooves 13A and the protrusions 14A are pressed together, coming into close contact with each other, thereby making it possible to ensure the sealing level between the inner shroud portions 13 and the seal holder 14.

The springs 15 are substantially rectangularly formed plate springs that are formed into substantially a wave shape, and the spring force of the springs 15 is adjusted by adjusting the plate thickness of the plate springs. With regard to the material forming the springs 15, the material is desirably capable of maintaining the required spring properties while the gas turbine 1 is in operation, that is, even if the springs 15 are heated to high temperature.

The springs 15 are disposed in a space formed between the inner shroud portions 13 and the seal holder 14, more specifically, between the inner shroud portions 13 and the spacer 16. Furthermore, a total of two springs 15, one on the leading edge LE side and another on the trailing edge TE side, are disposed in a parallel arrangement.

In this embodiment, descriptions will be given as applied to an example in which these two springs 15 are disposed at the same phase, in other words, an example in which peak portions of the two springs 15 come in contact with the inner shroud portions 13 or the spacer 16 at the same positions.

Figure 4:
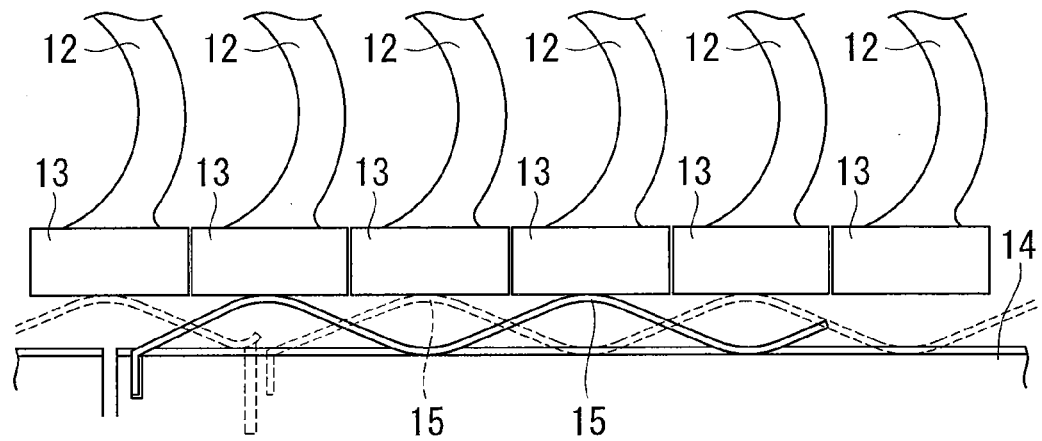
FIG. 4 is a schematic diagram for explaining another arrangement example of springs in FIG. 3.

FIG. 4 is a schematic diagram for explaining another arrangement example of the springs.

Note that, the two springs 15 may be disposed at the same phase, as described above, or they may be disposed at different phases, as shown in FIG. 4; it is not particularly limited.

With the arrangement of the springs 15 shown in FIG. 4, at locations where the peak portions of the first spring 15 are in contact with the inner shroud portions 13, the peak portions of the other spring 15 are in contact with the spacer 16.

By doing so, it is possible to make the springs 15 contact all of the inner shroud portions 13, even when arrangement intervals of the peak portions in the first spring 15 are wider than arrangement intervals of the inner shroud portions 13. That is, the inner shroud portions 13 with which the peak portions of the first spring 15 are not in contact are in contact with the peak portions of the other spring 15, thereby making it possible to have all of the inner shroud portions 13 in contact with the springs 15.

The shapes of the springs 15 are determined such that the amplitude of the wave shape (peak-to-peak distance in the radial direction) is longer than the distance from the inner circumferential surfaces of the inner shroud portions 13 to the outer circumferential surface of the spacer 16 and so that the peak portions of the springs 15 are in contact with the inner circumferential surfaces of individual inner shroud portions 13.

More specifically, the amplitude of the wave shape in the springs 15 is determined on the basis of the frictional force for damping the vibrations of the stator blades 10, that is, the compression level of the springs 15 required for generating the spring force. The wavelength (peak-to-peak distance in the circumferential direction) in the wave shape of the springs 15 is determined on the basis of the arrangement intervals of the inner shroud portions 13, that is, the pitch thereof.

As shown in FIG. 3, the spacer 16, together with the compressing bolts 18, presses the springs 15 toward the inner shroud portions 13 and is disposed between the bottom plate portion 14B of the seal holder 14 and the springs 15.

As with the seal holder 14, a single spacer 16 is disposed for the plurality of the airfoil portions 12 and the inner shroud portions 13. In other words, the spacer 16 is formed of a cylindrical member that has been divided into a plurality of portions, and the springs 15 come in contact with the inner circumferential surface thereof.

The spacer 16 is provided with through-holes 16H into which the compressing bolts 18 are inserted.

As shown in FIG. 3, the honeycomb seal 17, together with seal fins 22 provided in a rotor 21, suppresses leakage of the fluid that flows between the stator blades 10 and the rotor 21.

Any known honeycomb seal may be used as the honeycomb seal 17; it is not particularly limited.

Next, an assembly method of the stator blades 10 having the above-described configuration will be described.

Figure 5:
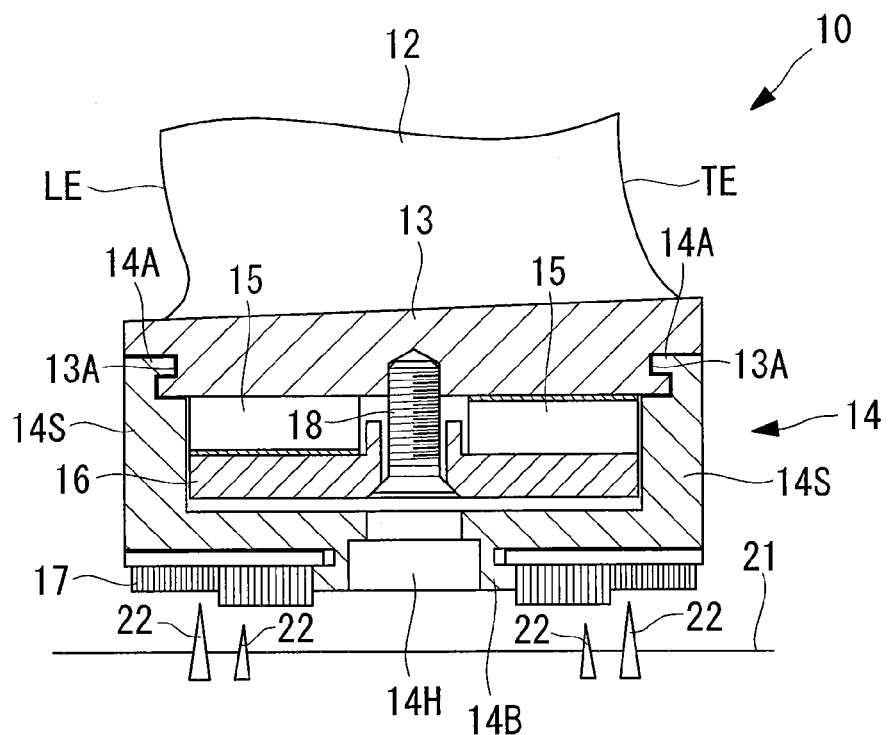
FIG. 5 is a schematic diagram for explaining attaching and detaching of the seal holder in the stator blades in FIG. 3.

FIG. 5 is a schematic diagram for explaining attaching and detaching of the seal holder in the stator blades in FIG. 3.

First, the springs 15 and the spacer 16 are disposed on the inner circumferential surface side in the inner shroud portions 13, and the compressing bolts 18 are screwed onto the inner shroud portions 13 via the through-holes 16H of the spacer 16. Then, by screwing the compressing bolts 18 further into the inner shroud portions 13, the spacer 16 is brought closer to the inner shroud portions 13 to compress the springs 15.

At this time, the distance from the inner circumferential surfaces of the inner shroud portions 13 to the outer circumferential surface of the spacer 16 is made shorter than the distance from the inner circumferential surfaces of the inner shroud portions 13 to the outer circumferential surface of the bottom plate portion 14B of the seal holder 14.

Subsequently, the seal holder 14 is fitted to the inner shroud portions 13. More specifically, the protrusions 14A of the seal holder 14 are fitted to the fitting grooves 13A in the inner shroud portions 13. At this time, the seal holder 14 is fitted while sliding it in the circumferential direction relative to the inner shroud portions 13.

Figure 6:
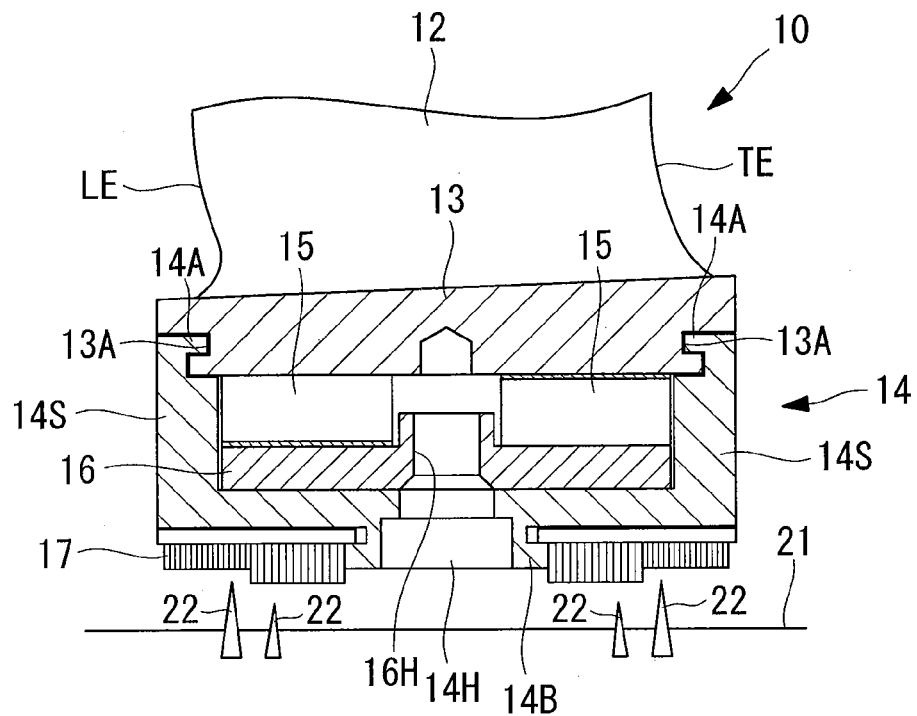
FIG. 6 is a schematic diagram for explaining the state after the seal holder is attached to the stator blades in FIG. 3.

FIG. 6 is a schematic diagram for explaining the state after the seal holder is attached to the stator blades in FIG. 3.

Then, as shown in FIG. 6, the compressing bolts 18 are removed from the inner shroud portions 13 via the through-holes 14H of the seal holder 14, and thus, attaching of the seal holder 14 is completed.

The seal holder 14 is removed by carrying out the above-described steps sequentially in reverse order.

Note that, the compressing bolts 18 may be completely removed from the stator blades 10 as described above, or they may remain on the stator blades 10 in a state in which a predetermined level of compression is exerted on the springs 15; it is not particularly limited.

Next, a method of damping vibrations in the stator blades 10 having the above-described configuration will be described.

When the gas turbine 1 is operated, vibrations are generated in the stator blades 10 due to the influence of the fluid or the like flowing in the compressor 2. More specifically, vibrations are generated by which the airfoil portions 12 and the inner shroud portions 13 of the stator blades 10 vibrate in the circumferential direction.

When the inner shroud portions 13 vibrate as described above, sliding occurs between the peak portions of the springs 15, which are pressed against the inner shroud portions 13, and the inner circumferential surfaces of the inner shroud portions 13. The pressing force of the springs 15 and the frictional force in accordance with the friction coefficient between the inner shroud portions 13 and the springs 15 act between the inner shroud portions 13 and the springs 15.

The above-described sliding converts vibrational energy of the airfoil portions 12 and the inner shroud portions 13 into frictional energy, such as thermal energy and so forth, thereby damping the vibrations in the stator blades 10.

With the above-described configuration, when the airfoil portions 12 and the inner shroud portions 13 vibrate and slide relative to the seal holder 14, the springs 15, which have been pressing the inner shroud portions 13 in the direction away from the seal holder 14, and the inner shroud portions 13 relatively move; that is, the springs 15 and the inner shroud portions 13 slide. Accordingly, energy associated with the vibrations in the airfoil portions 12 and the inner shroud portions 13 is converted into thermal energy (frictional energy) due to sliding, thereby making it possible to damp the vibrations in the airfoil portions 12 and the inner shroud portions 13.

Furthermore, because the compression level of the springs 15 is adjusted by moving the spacer 16 closer to the inner shroud portions 13, the force with which the springs 15 press the inner shroud portions 13 is adjusted. In other words, because the frictional force between the springs 15 and the inner shroud portions 13 is adjusted, it is possible to adjust the level of damping of vibrations in the airfoil portions 12 and the inner shroud portions 13.

On the other hand, the springs 15 can be easily replaced by attaching/detaching the springs 15, together with the seal holder 14, to/from the inner shroud portions 13 by sliding them. Accordingly, even if the springs 15 become deteriorated due to wear from long-term use, the springs 15 can easily be replaced.

In addition, the springs 15 are disposed inside the space surrounded by the seal holder 14 and the inner shroud portions 13; therefore, even if the springs 15 break, it is possible to prevent them from leaping out of the space to damage the airfoil portions 12.

Furthermore, by moving the spacer 16 closer to the inner shroud portions 13, the biasing force of the springs 15 is received by the inner shroud portions 13 and the spacer 16. In other words, the biasing force of the springs 15 does not act on the seal holder 14. Accordingly, when moving the seal holder 14 by sliding it relative to the inner shroud portions 13 or when attaching/detaching the seal holder 14, the frictional force that acts at contact surfaces between the inner shroud portions 13 and the seal holder 14 is reduced, thereby making it possible to facilitate the sliding movement or attaching/detaching.

Because the inner shroud portions 13 are independently disposed for each of the plurality of the airfoil portions 12, the individual airfoil portions 12 and the inner shroud portions 13 readily move relative to the springs 15, as compared with the case in which the plurality of the inner shroud portions 13 are integrally formed. In other words, the sliding distance between the inner shroud portions 13 and the springs 15 is extended.

Accordingly, a greater amount of energy associated with the vibrations in the airfoil portions 12 and the inner shroud portions 13 is converted into thermal energy (frictional energy) due to sliding, and therefore, the vibrations in the airfoil portions 12 and the inner shroud portions 13 are more readily damped.

On the other hand, because a single seal holder 14 is provided for the plurality of the airfoil portions 12 and the inner shroud portions 13, the sealing level between the upstream side and the downstream side of the stator blades 10 can be increased as compared with the case in which the seal holders 14 are disposed for each of the plurality of the airfoil portions 12 and the inner shroud portions 13.

By employing plate-like springs formed into a wave-like shape as the springs 15, a larger pressing force can be exerted on the inner shroud portions 13 as compared with the case in which other types of springs are employed.

On the other hand, by making each of the peak portions of the springs 15 individually contact the inner shroud portions 13, the plurality of the inner shroud portions 13 can be moved, by sliding them, with respect to a single spring 15.

The spacer 16 can be moved closer to the inner shroud portions 13 using the compressing bolts 18. Accordingly, the compression level of the springs 15 is adjusted, thereby adjusting the force with which the springs 15 press the inner shroud portions 13. In other words, because the frictional force between the springs 15 and the inner shroud portions 13 is adjusted, it is possible to adjust the level of damping of vibrations in the airfoil portions 12 and the inner shroud portions 13.

On the other hand, by moving the spacer 16 closer to the inner shroud portions 13, the biasing force of the springs 15 is received by the inner shroud portions 13 and the spacer 16. Accordingly, when moving the seal holder 14 by sliding it relative to the inner shroud portions 13 or when attaching/detaching the seal holder 14, the frictional force that acts at contact surfaces between the inner shroud portions 13 and the seal holder 14 is reduced, thereby making it possible to facilitate the sliding movement or attaching/detaching.

Figure 7:
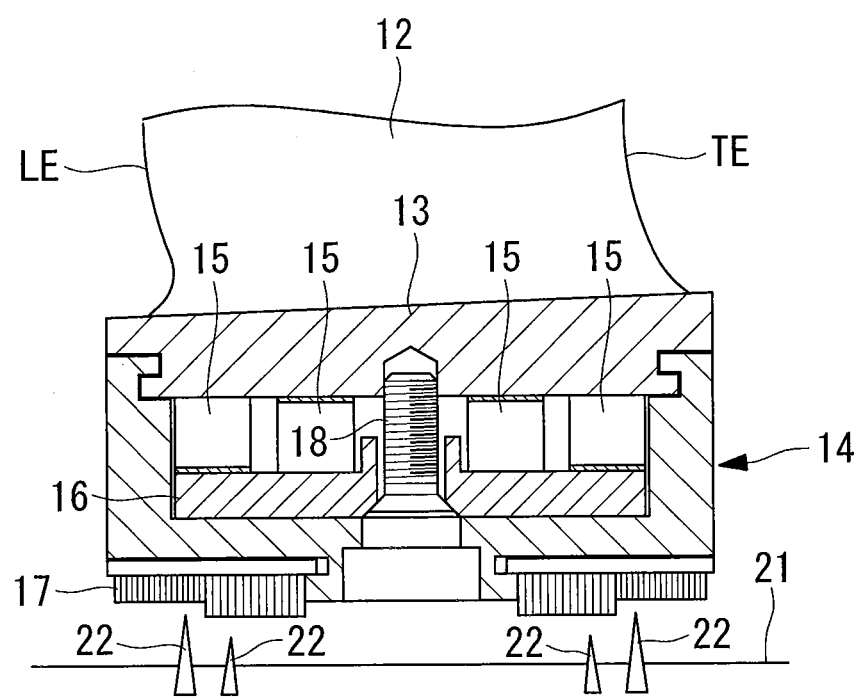
FIG. 7 is a schematic diagram for explaining yet another arrangement example of the springs in FIG. 3.

FIG. 7 is a schematic diagram for explaining yet another arrangement example of the springs in FIG. 3.

Note that, two springs 15 may be disposed between the inner shroud portions 13 and the spacer 16, as in the embodiment described above, or, as shown in FIG. 7, four springs 15 may be disposed between the inner shroud portions 13 and the spacer 16; the number of the springs 15 is not particularly limited.

Furthermore, the spacer 16 may be pressed toward the inner shroud portions 13 by screwing the compressing bolts 18 onto the inner shroud portions 13 as in the above-described embodiment, or the spacer 16 may be pressed toward the inner shroud portions 13 by screwing the pressing springs 15 onto the seal holder 14 to thereby press the tip of the pressing springs 15 against the spacer 16; it is not particularly limited.

As in the embodiment described above, the gas turbine 1 may be operated in a state in which the spacer 16 remains between the seal holder 14 and the inner shroud portions 13, or the gas turbine 1 may be operated with the spacer 16 removed from between the seal holder 14 and the inner shroud portions 13; it is not particularly limited.

As in the embodiment described above, the spring force of the springs 15 may be adjusted by adjusting the compression level of the springs 15 using the compressing bolts 18 or, even in a state in which the compressing bolts 18 are removed, the spring force of the springs 15 may be adjusted by adjusting only the plate thickness of the spacer 16; it is not particularly limited.

{Second Embodiment}

A gas turbine according to a second embodiment of the present invention will be described with reference to FIGS. 8 to 15. Note that, in this embodiment, turbine blades of the invention of the present application will be described as applied to stator blades of first to fourth stages in the compressor 2 of the gas turbine 1.

Figure 8:
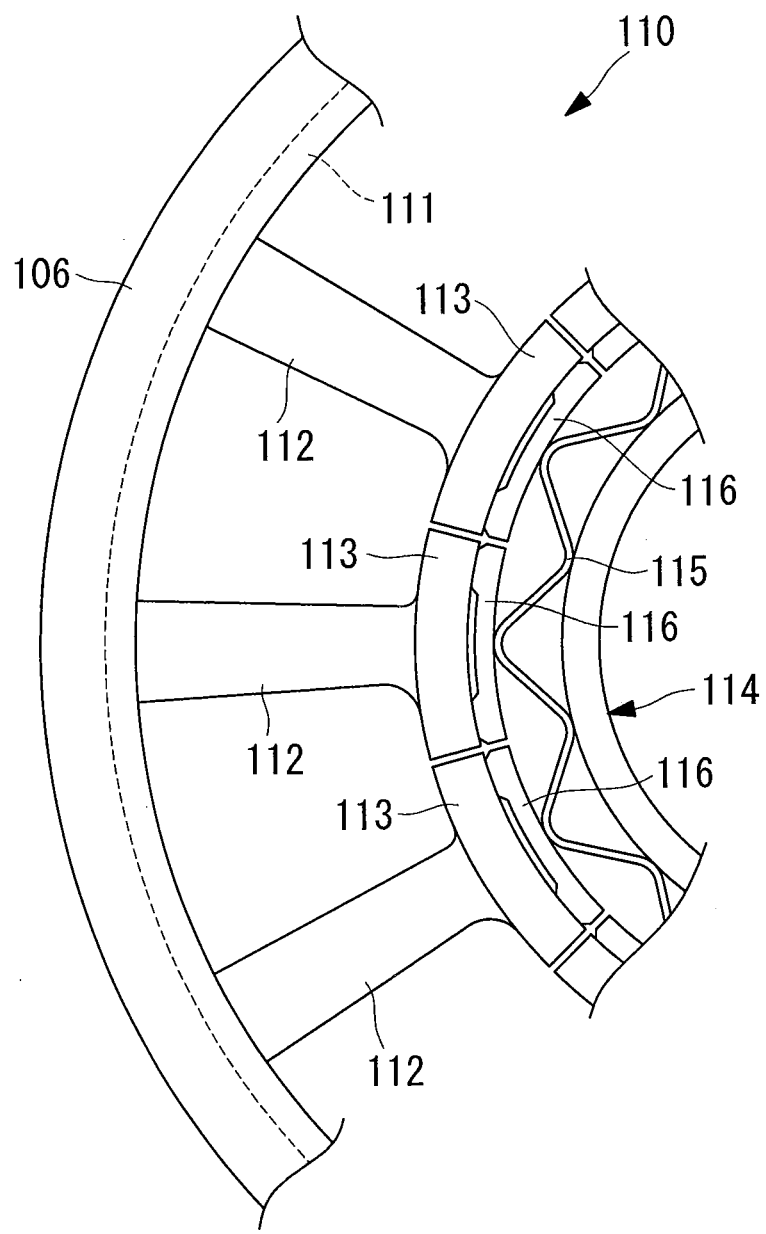
FIG. 8 is a schematic diagram for explaining the configuration of a rotor disc and stator blades in a compressor of a gas turbine according to the second embodiment of the present invention.

FIG. 8 is a schematic diagram for explaining the configuration of a rotor disc and stator blades in a compressor of a gas turbine according to this embodiment.

As shown in FIGS. 1 and 8, the compressor 2 is provided with stator blades (turbine blades) 110 that are attached to a casing 6 of the gas turbine 1 and rotor blades that are disposed at a circumferential surface of a circular plate-shaped rotor disc (not shown) which is rotationally driven by the rotational shaft 5.

The stator blades 110 and the rotor blades are disposed in rows in the circumferential direction of the rotational shaft 5 at regular intervals and are disposed in alternating rows in the axial direction of the rotational shaft 5.

Next, the stator blades 110, which are the feature of this embodiment, will be described.

Figure 9:
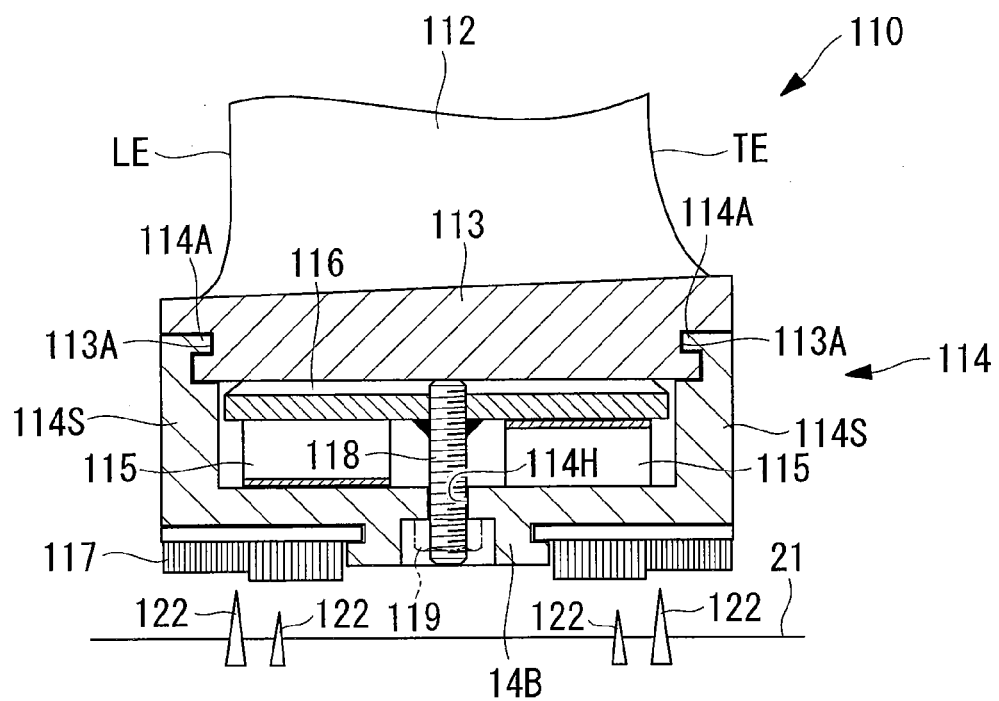
FIG. 9 is a cross-sectional view for explaining the configuration near a seal holder in the stator blades in FIG. 8.

FIG. 9 is a cross-sectional view for explaining the configuration near a seal holder in the stator blade in FIG. 8.

As shown in FIGS. 8 and 9, the stator blades 110 are provided with an outer shroud portion 111, airfoil portions 112, inner shroud portions (shroud portions) 113, a seal holder (holder casing) 114, springs (elastic portions) 115, damping plates (friction portions) 116, and a honeycomb seal 117.

As shown in FIG. 8, the outer shroud portion 111 is a member that forms part of wall surfaces of a flow channel in which fluid flows in the compressor 2. Furthermore, the outer shroud portion 111 is a curved plate-like member disposed at end portions of the airfoil portions 112 on the radially outer side thereof, and a single outer shroud portion 111 is disposed for a plurality of the airfoil portions 112. In other words, the outer shroud portion 111 is formed of a cylindrical member that has been divided into a plurality of portions, and the plurality of the airfoil portions 112 are connected to an inner circumferential surface thereof.

With regard to the shape of the outer shroud portion 111 and the connection method with the airfoil portions 112, any known shapes and methods can be employed; they are not particularly limited.

As shown in FIG. 8, the airfoil portions 112 are members whose cross-sections extending in the radial direction of the rotational shaft 5 are formed in airfoil shapes and that, together with the rotor blades rotationally driven by the rotational shaft 5, compress a fluid, such as air, and send it toward the combustor 3.

The airfoil portions 112 are provided with leading edges LE, which are upstream-end portions relative to a flow of surrounding fluid, trailing edges TE, which are downstream-end portions, negative pressure surfaces, which are surfaces curved in convex shapes, and positive pressure surfaces, which are curved in concave shapes.

As shown in FIGS. 8 and 9, the inner shroud portions 113, as well as the outer shroud portion 111, form part of the flow channel in which the fluid flows inside the compressor 2. Furthermore, the inner shroud portions 113 are curved plate-like members disposed at end portions of the airfoil portions 112 on radially inner side thereof, and a single inner shroud portion 113 is disposed for a single airfoil portion 112. In other words, the inner shroud portions 113 are formed of a cylindrical member that has been divided into a plurality of portions, and the airfoil portions 112 are connected to outer circumferential surfaces thereof.

Fitting grooves 113A that fit with the seal holder 144, extending in the circumferential direction (direction perpendicular to the plane of the drawing in FIG. 9), are provided at end portions on the leading edge LE side and trailing edge TE side of the inner shroud portions 113.

As shown in FIG. 9, the seal holder 114 is a member that is attached to the inner shroud portions 113 on the inner circumferential side thereof (bottom side in FIG. 9), that, together with the inner shroud portions 113, forms a space for accommodating the springs 115 and the damping plates 116 inside thereof, and that supports the honeycomb seal 117.

As with the outer shroud portion 114, a single seal holder 114 is disposed for the plurality of the airfoil portions 112 and the inner shroud portions 113.

The seal holder 114 is provided with a pair of side wall portions 114S that extend in radial directions at the leading edge LE side and the trailing edge TE side and a bottom plate portion 114B which connects end portions of the pair of side wall portions 114S at the radially inner side thereof.

In other words, a groove portion is formed in the seal holder 114, opening outward in the circumferential direction (top side in FIG. 9).

The radially outer-side end portions of the side wall portions 114S are provided with protrusions 114A which protrude inward in the seal holder 114, extending in the circumferential direction thereof, and fit with the fitting grooves 113A of the inner shroud portions 113.

The bottom plate portion 114B is provided with through-holes 114H into which compressing bolts (compressing portions) 118 that press the damping plates 116 together with the springs 115 are inserted. The through-holes 114H are provided in the bottom plate portion 114B at an equidistant position from each of the pair of side wall portions 114S and a plurality thereof are provided in the circumferential direction (direction perpendicular to the plane of the drawing in FIG. 9) at predetermined intervals.

As shown in FIGS. 8 and 9, the springs 115 are elastic members that bias the inner shroud portions 113 and the damping plates 116 in directions that separate them from the seal holder 114. Furthermore, the springs 115, together with the damping plates 116, damp the vibrations in the stator blades 110, i.e., the airfoil portions 112, and the inner shroud portions 113.

In this way, by having the springs 115 bias the inner shroud portions 113 in the directions that separate them from the seal holder 114, the fitting grooves 113A and the protrusions 114A are pressed together, coming into close contact with each other, thereby making it possible to ensure the sealing level between the inner shroud portions 113 and the seal holder 114.

The springs 115 are substantially rectangularly formed plate springs that are formed into substantially a wave shape, and the spring force of the springs 115 is adjusted by adjusting the plate thickness of the plate springs. With regard to the material forming the springs 115, the material is desirably capable of maintaining the required spring properties while the gas turbine 1 is in operation, that is, even if the springs 115 are heated to high temperature.

The springs 115 are disposed in the space formed between the inner shroud portions 113 and the seal holder 114, more specifically, between the seal holder 114 and the damping plates 116. Furthermore, a total of two springs 115, one on the leading edge LE side and another on the trailing edge TE side, are disposed in a parallel arrangement.

In this embodiment, descriptions will be given as applied to an example in which these two springs 115 are disposed at the same phase, in other words, an example in which peak portions of the two springs 115 come in contact with the damping plates 116 or the seal holder 114 at the same positions.

Figure 10:
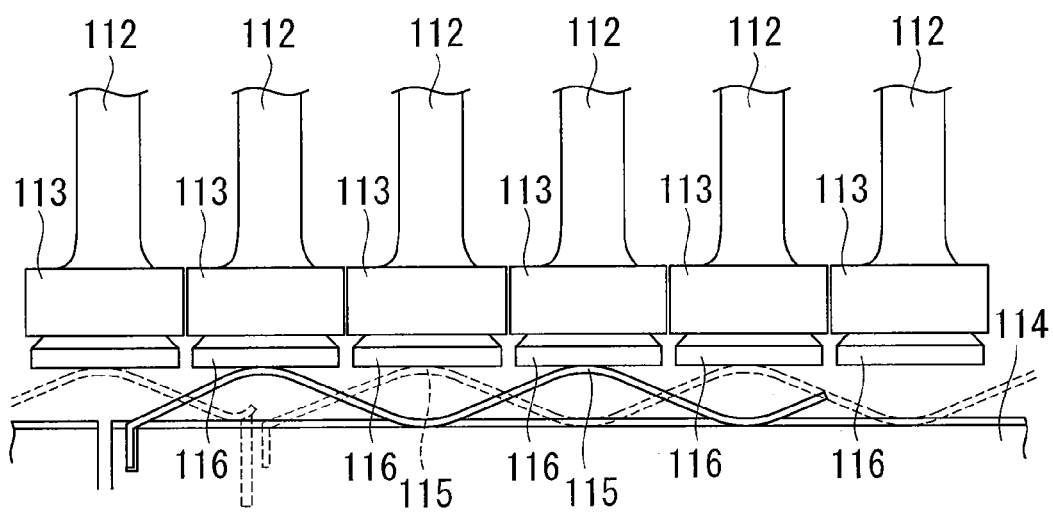
FIG. 10 is a schematic diagram for explaining another arrangement example of springs in FIG. 9.

FIG. 10 is a schematic diagram for explaining another arrangement example of the springs in FIG. 9.

Note that, the two springs 115 may be disposed at the same phase, as described above, or they may be disposed at different phases, as shown in FIG. 10; it is not particularly limited.

With the arrangement of the springs 115 shown in FIG. 10, at locations where the peak portions of the first spring 115 are in contact with the damping plates 116, the peak portions of the other spring 115 are in contact with the seal holder 114.

By doing so, it is possible to make the springs 115 contact all of the damping plates 116, even when arrangement intervals of the peak portions in the first spring 115 are wider than arrangement intervals of the inner shroud portions 113 and the damping plates 116. That is, the damping plates 116 with which the peak portions of the first spring 115 are not in contact are in contact with the peak portions of the other spring 115, thereby making it possible to have all of the damping plates 116 in contact with the springs 115.

The shapes of the springs 115 are determined such that the amplitude of the wave shape (peak-to-peak distance in the radial direction) is longer than the distance from the outer circumferential surfaces of the damping plates 116 to the inner circumferential surface of the seal holder 114 and so that the peak portions of the springs 115 are in contact with the inner circumferential surfaces of individual damping plates 116.

More specifically, the amplitude of the wave shape in the springs 115 is determined on the basis of the frictional force for damping the vibrations of the stator blades 110, that is, the compression level of the springs 115 required for generating the spring force. The wavelength (peak-to-peak distance in the circumferential direction) in the wave shape of the springs 115 is determined on the basis of the arrangement intervals of the inner shroud portions 113 and damping plates 116, that is, the pitch thereof.

As shown in FIG. 9, the damping plates 116 are pressed against the inner circumferential surfaces of the inner shroud portions 113 by the springs 115 and are disposed between the inner shroud portions 113 and the springs 115.

As with the inner shroud portions 113, one damping plate 116 is disposed for each of the plurality of the airfoil portions 112 and the inner shroud portions 113.

Figure 11:
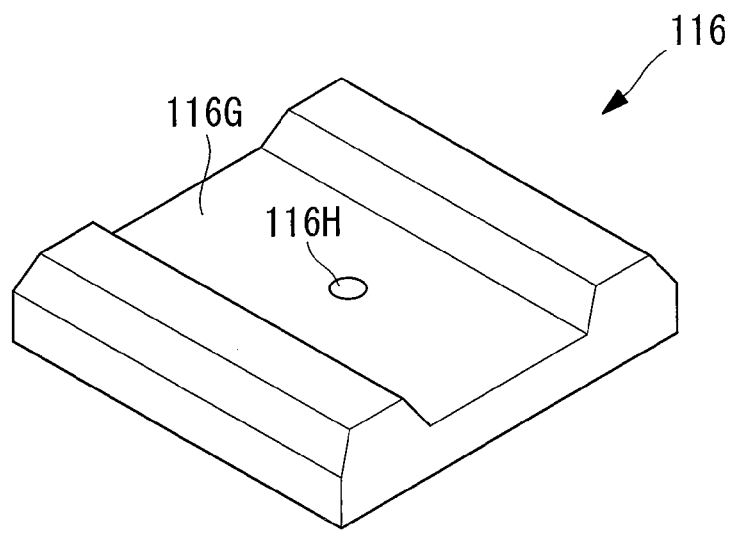
FIG. 11 is a schematic diagram for explaining the configuration of damping plates in FIG. 9.

FIG. 11 is a schematic diagram for explaining the configuration of the damping plates in FIG. 9.

The damping plates 116 are provided with bolt holes 116H into which the compressing bolts 118 are screwed and relief grooves 116G formed on surfaces facing the inner shroud portions 113.

The bolt holes 116H are female screw holes formed substantially at the center of the damping plates 116 and the compressing bolts 118 are screwed thereinto.

First end portions of the compressing bolts 118 are screwed into the bolt holes 116H of the damping plates 116. Second end portions of the compressing bolts 118 are inserted into the through-holes 114H of the seal holder 114. The nuts (compressing portions) 119, which compress the springs 115 together with the compressing bolts 118, are threaded onto the second end portions of the compressing bolts 118.

As shown in FIGS. 9 and 11, the relief grooves 116G are grooves formed on the surfaces (top-side surfaces in FIGS. 9 and 11) of the damping plates 116 facing the inner shroud portions 113. In addition, the relief grooves 116G are grooves extending in the direction parallel to the direction in which the rotational shaft 5 extends (direction perpendicular to the plane of the drawing in FIG. 9), in other words, grooves extending in a direction that intersect with, more preferably a direction perpendicular to, the direction in which the damping plates 116 and the inner shroud portions 113 slide.

By providing the relief grooves 116G in this way, the surfaces of the damping plates 116 that come into contact with the inner shroud portions 113 are divided into two with the relief grooves 116G therebetween, and each surface comes into contact with the inner shroud portions 113. Accordingly, even if the inner shroud portions 113 and the damping plates 116 slide, the inner shroud portions 113 and the damping plates 116 come into stable contact at the above-described two surfaces, thereby preventing the occurrence of problems such as partial contact or the like.

As shown in FIG. 9, the honeycomb seal 117, together with seal fins 122 provided in a rotor 21, suppresses leakage of a fluid that flows between the stator blades 110 and the rotor 21.

Any known honeycomb seal may be used as the honeycomb seal 117; it is not particularly limited.

Next, an assembly method of the stator blades 110 having the above-described configuration will be described.

Figure 12:
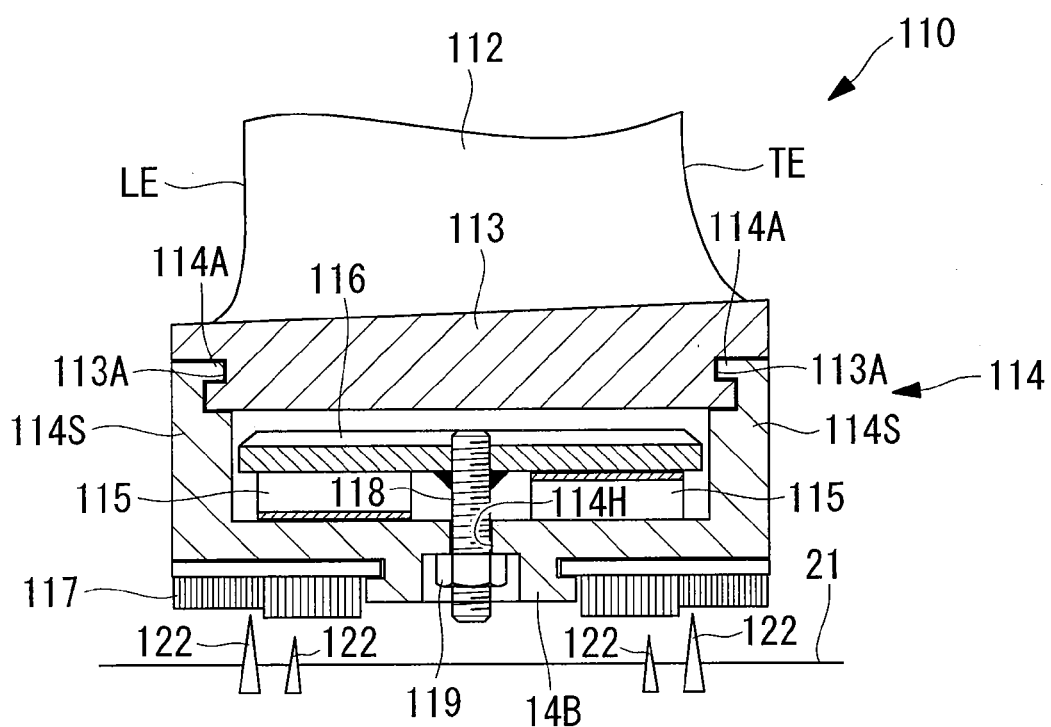
FIG. 12 is a schematic diagram for explaining attaching and detaching of the seal holder to and from the stator blades in FIG. 9.

FIG. 12 is a schematic diagram for explaining attaching and detaching of the seal holder in the stator blades in FIG. 9.

First, the springs 115 and the damping plates 116 are disposed inside the seal holder 114, and the second end portions of the compressing bolts 118 are inserted into the through-holes 114H of the seal holder 114. Then, by threading the nuts 119 on the second end portions of the compressing bolts 118, the damping plates 116 are brought closer to the bottom plate portion 114B of the seal holder 114, thereby compressing the springs 115.

At this time, the distance from the outer circumferential surface of the bottom plate portion 114B to the outer circumferential surfaces of the damping plates 116 is made shorter than the distance from the outer circumferential surface of the bottom plate portion 114B to the inner circumferential surfaces of the inner shroud portions 113.

Subsequently, the seal holder 114 is fitted to the inner shroud portions 113. More specifically, the protrusions 114A of the seal holder 114 are fitted to the fitting grooves 113A in the inner shroud portions 113. At this time, the seal holder 114 is fitted while sliding it in the circumferential direction relative to the inner shroud portions 113.

Figure 13:
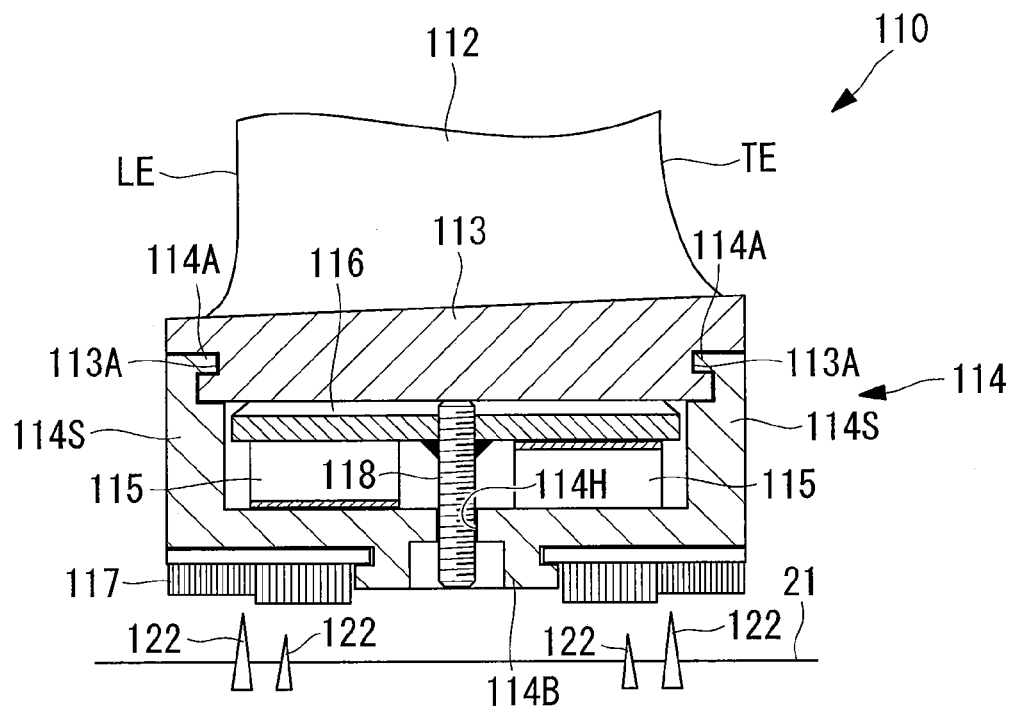
FIG. 13 is a schematic diagram for explaining the state after the seal holder is attached to the stator blades in FIG. 9.

FIG. 13 is a schematic diagram for explaining the state after the seal holder is attached to the stator blade in FIG. 9.

Then, as shown in FIG. 13, the nuts 119 are removed from the compressing bolts 118, and the damping plates 116 are brought into contact with the inner shroud portions 113, thereby completing the attaching of the seal holder 114.

The seal holder 114 is removed by carrying out the above-described steps sequentially in reverse order.

Note that, the compressing bolts 118 may be left attached to the damping plates 116, as described above, or they may be removed from the damping plates 116; it is not particularly limited.

Next, a method of damping vibrations in the stator blades 110 having the above-described configuration will be described.

When the gas turbine 1 is operated, vibrations are generated in the stator blades 110 due to the influence of the fluid or the like flowing in the compressor 2. More specifically, vibrations are generated by which the airfoil portions 112 and the inner shroud portions 113 of the stator blades 110 vibrate in the circumferential direction.

When the inner shroud portions 113 vibrate as described above, sliding occurs between the damping plates 116, which are pressed against the inner shroud portions 113, and the inner circumferential surfaces of the inner shroud portions 113. The pressing force of the springs 115 and the frictional force in accordance with the friction coefficient between the inner shroud portions 113 and the damping plates 116 act between the inner shroud portions 113 and the damping plates 116.

The above-described sliding converts vibrational energy of the airfoil portions 112 and the inner shroud portions 113 into frictional energy, such as thermal energy and so forth, thereby damping the vibrations in the stator blades 110.

With the above-described configuration, when the airfoil portions 112 and the inner shroud portions 113 vibrate and slide relative to the seal holder 114, the damping plates 116, which have been pressed against the inner shroud portions 113, and the inner shroud portions 113 relatively move; that is, the damping plates 116 and the inner shroud portions 113 slide. Accordingly, energy associated with the vibrations in the airfoil portions 112 and the inner shroud portions 113 is converted into thermal energy (frictional energy) due to the sliding, thereby making it possible to damp the vibrations in the airfoil portions 112 and the inner shroud portions 113.

On the other hand, by moving the damping plates 116 closer to the seal holder 114, the biasing force of the springs 115 is received by the damping plates 116 and the seal holder 114. In other words, the biasing force of the springs 115 does not act on the inner shroud portions 113. Accordingly, when moving the seal holder 114 by sliding it relative to the inner shroud portions 113 or when attaching/detaching the seal holder 114, the frictional force that acts at contact surfaces between the inner shroud portions 113 and the seal holder 114 is reduced, thereby making it possible to facilitate the sliding movement or attaching/detaching.

Furthermore, the springs 115 can be easily replaced by attaching/detaching the springs 115, together with the seal holder 114, to/from the inner shroud portions 113 by sliding them. Accordingly, even if the springs 115 become deteriorated due to wear from long-term use, the springs 115 can easily be replaced.

In addition, the springs 115 are disposed inside the space surrounded by the seal holder 114 and the inner shroud portions 113; therefore, even if the springs 115 break, it is possible to prevent them from leaping out of the space to damage the airfoil portions 112.

Because the inner shroud portions 113 are independently disposed for each of the plurality of the airfoil portions 112, the individual airfoil portions 112 and the inner shroud portions 113 readily move relative to the damping plates 116, as compared with the case in which the plurality of the inner shroud portions 113 are integrally formed. In other words, the sliding distance between the inner shroud portions 113 and the damping plates 116 is extended.

Accordingly, a greater amount of energy associated with the vibrations in the airfoil portions 112 and the inner shroud portions 113 is converted into thermal energy (frictional energy) due to sliding, and therefore, the vibrations in the airfoil portions 112 and the inner shroud portions 113 are more readily damped.

On the other hand, because a single seal holder 114 is provided for the plurality of the airfoil portions 112 and the inner shroud portions 113, the sealing level between the upstream side and the downstream side of the stator blades 110 can be increased as compared with the case in which the seal holders 114 are disposed for each of the plurality of the airfoil portions 112 and the inner shroud portions 113.

By employing springs formed into a wave-like shape as the springs 115, a larger pressing force can be exerted on the inner shroud portions 113 as compared with the case in which other types of springs are employed.

On the other hand, by making each of the peak portions of the springs 115 individually contact the damping plates 116, the plurality of the damping plates 116 are pressed against the inner shroud portions 113 by a single spring.

Because the compressing bolts 118 protrude from the damping plates 116 penetrating the seal holder 114, the compressing bolts 118 and the damping plates 116 are movable in directions toward and away from the seal holder 114, while being restricted in movement in the direction that intersects with the direction of movement toward/away from the seal holder 114; that is, movement in the circumferential direction of the rotational shaft 5 is restricted. Accordingly, it is ensured that sliding occurs between the inner shroud portions 113 and the damping plates 116.

Figure 14:
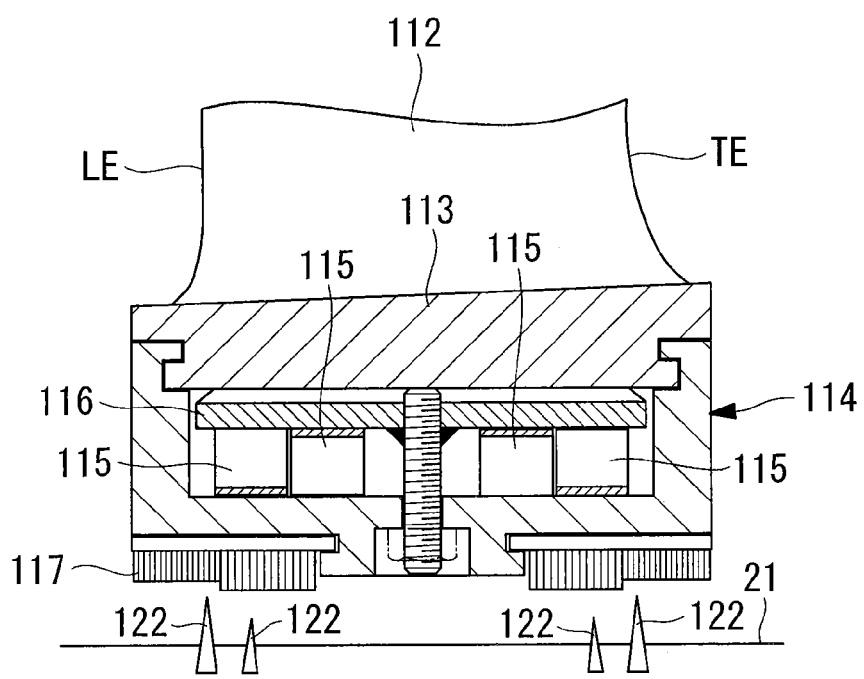
FIG. 14 is a schematic diagram for explaining yet another arrangement example of the springs in FIG. 3.

FIG. 14 is a schematic diagram for explaining yet another arrangement example of the springs in FIG. 3.

Note that, two springs 115 may be disposed between the damping plates 116 and the seal holder 114, as in the embodiment described above, or, as shown in FIG. 14, four springs 115 may be disposed between the damping plates 116 and the seal holder 114; the number of the springs 115 is not particularly limited.

Figure 15:
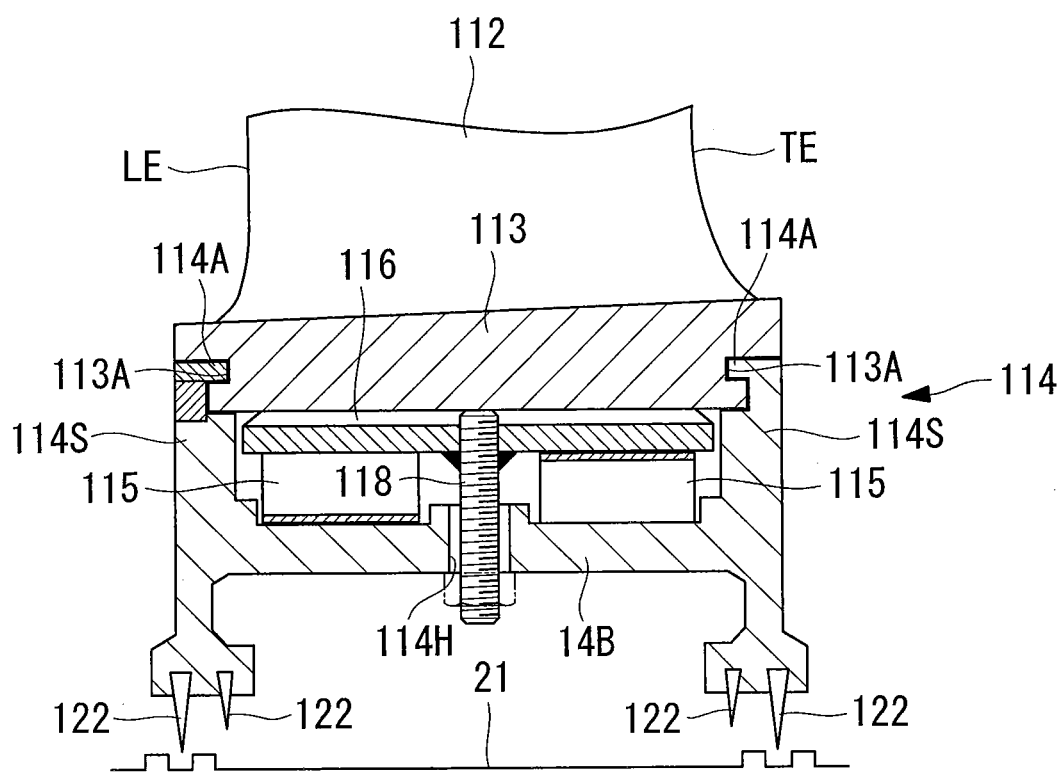
FIG. 15 is a schematic diagram for explaining another configuration of the seal holder in FIG. 9.

FIG. 15 is a schematic diagram for explaining another configuration of the seal holder in FIG. 9.

Note that, as in the above-described embodiment, the honeycomb seal 117 may be disposed in the seal holder 114, and the seal fins 122 may be disposed at the rotor 21 or, as shown in FIG. 15, seal fins 122 may be disposed in the seal holder 114, configuring them as a labyrinth seal in which steps are provided at positions that face the seal fins 122 of the rotor 21; it is not particularly limited.

As in the embodiment described above, the spring force of the springs 115 may be adjusted by adjusting the compression level of the springs 115 using compressing bolts 118 and the nuts 119 or, even in a state in which the nuts 119 are removed, the spring force of the springs 115 may be adjusted by adjusting only the plate thickness of the damping plates 116; it is not particularly limited.

{Third Embodiment}

A gas turbine according to a third embodiment of this invention will now be described with reference to FIG. 1 and FIGS. 16 to 19. Note that, in this embodiment, turbine blades of the invention of the present application will be described as applied to stator blades of first to third, fifth to seventeenth, or tenth to fourteenth stages in the compressor 2 of the gas turbine 1.

Figure 16:
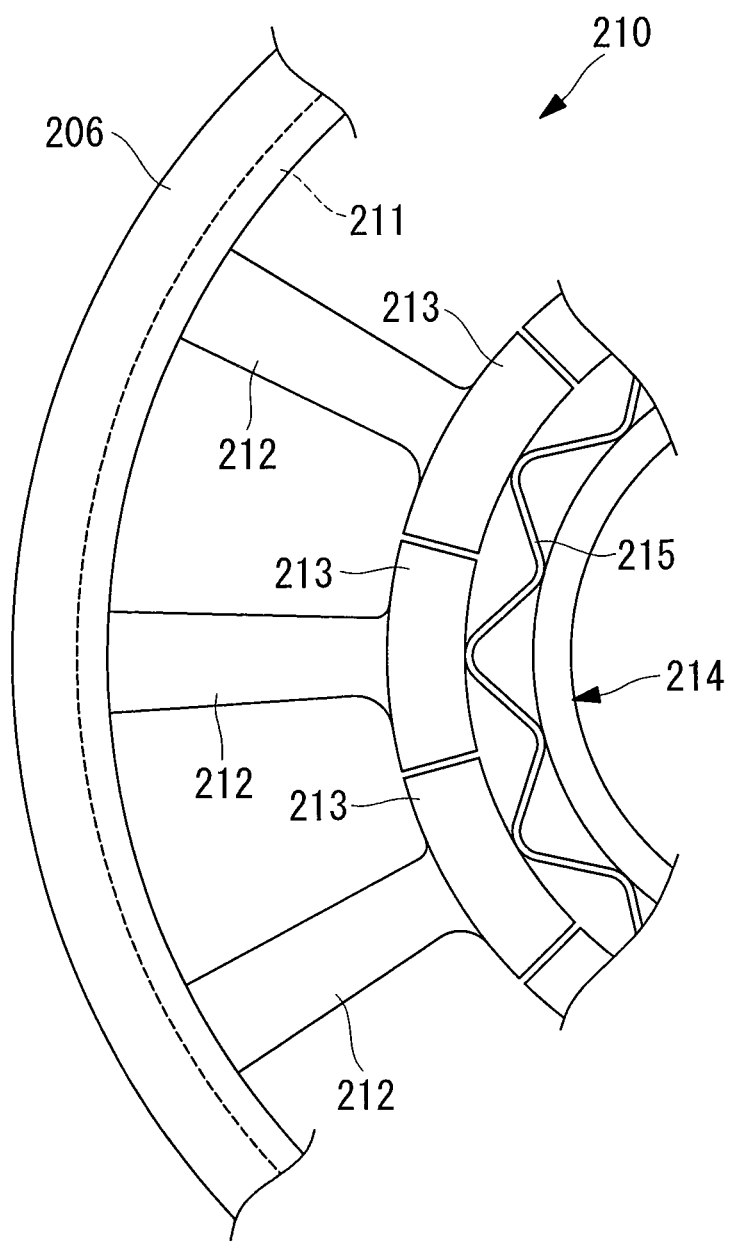
FIG. 16 is a schematic diagram for explaining the configuration of a rotor disc and stator blades in a compressor of a gas turbine according to the third embodiment of the present invention.

FIG. 16 is a schematic diagram for explaining the configuration of a rotor disc and stator blades in a compressor of a gas turbine according to this embodiment.

As shown in FIGS. 1 and 16, the compressor 2 is provided with stator blades (turbine blades) 210 that are attached to a casing 6 of the gas turbine 1 and rotor blades that are disposed at a circumferential surface of a circular plate-like rotor disc (not shown) which is rotationally driven by the rotational shaft 5.

The stator blades 210 and the rotor blades are disposed in rows in the circumferential direction of the rotational shaft 5 at regular intervals and are disposed in alternating rows in the axial direction of the rotational shaft 5.

Next, the stator blades 210, which are the feature of this embodiment, will be described.

Figure 17:
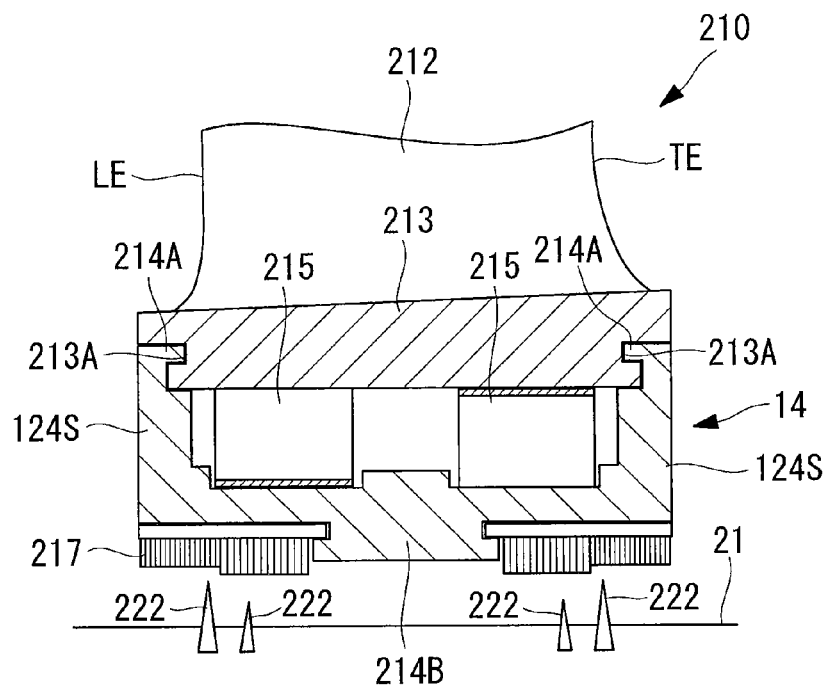
FIG. 17 is a cross-sectional view for explaining the configuration near a seal holder in the stator blades in FIG. 16.

FIG. 17 is a cross-sectional view for explaining the configuration near a seal holder in the stator blades in FIG. 16.

In this embodiment, the stator blades 210 will be described as applied to stator blades with fixed pitch, in other words, stator blades with fixed angles of attack with respect to the flow of the fluid flowing inside the compressor 2.

As shown in FIGS. 16 and 17, the stator blades 210 are provided with an outer shroud portion 211, airfoil portions 212, inner shroud portions (shroud portions) 213, a seal holder (holder casing) 214, springs (elastic portions) 215, and a honeycomb seal 217.

As shown in FIG. 16, the outer shroud portion 211 is a member that forms part of wall surfaces of a flow channel in which fluid flows in the compressor 2. Furthermore, the outer shroud portion 211 is a curved plate-like member disposed at end portions of the airfoil portions 212 on the radially outer side thereof, and a single outer shroud portion 211 is disposed for a plurality of the airfoil portions 212. In other words, the outer shroud portion 211 is formed of a cylindrical member that has been divided into a plurality of portions, and the plurality of the airfoil portions 212 are connected to an inner circumferential surface thereof.

With regard to the shape of the outer shroud portion 211 and the connection method with the airfoil portions 212, any known shapes and methods can be employed; they are not particularly limited.

As shown in FIG. 16, the airfoil portions 212 are members whose cross-sections extending in the radial direction of the rotational shaft 5 are formed in airfoil shapes and that, together with the rotor blades rotationally driven by the rotational shaft 5, compress a fluid such as air and send it toward the combustor 3.

The airfoil portions 212 are provided with leading edges LE, which are upstream-end portions relative to a flow of surrounding fluid, trailing edges TE, which are downstream-end portions, negative pressure surfaces, which are surfaces curved in convex shapes, and positive pressure surfaces, which are curved in concave shapes.

As shown in FIGS. 16 and 17, the inner shroud portions 213, as well as the outer shroud portion 211, form part of the flow channel in which the fluid flows inside the compressor 2. Furthermore, the inner shroud portions 213 are curved plate-like members disposed at end portions of the airfoil portions 212 on radially inner side thereof, and a single inner shroud portion 213 is disposed for a single airfoil portion 212. In other words, the inner shroud portions 213 are formed of a cylindrical member that has been divided into a plurality of portions, and the airfoil portions 212 are connected to outer circumferential surfaces thereof.

Fitting grooves 213A that fit with the seal holder 214, extending in the circumferential direction (direction perpendicular to the plane of the drawing in FIG. 17), are provided at end portions on the leading edge LE side and trailing edge TE side of the inner shroud portions 213.

As shown in FIG. 17, the seal holder 214 is a member that is attached to the inner shroud portions 213 on the inner circumferential side thereof (bottom side in FIG. 17), that, together with the inner shroud portions 213, forms a space for accommodating the springs 215 inside thereof, and that supports the honeycomb seal 217.

As with the outer shroud portion 211, a single seal holder 214 is disposed for the plurality of the airfoil portions 212 and the inner shroud portions 213.

The seal holder 214 is provided with a pair of side wall portions 214S that extend in radial directions at the leading edge LE side and the trailing edge TE side and a bottom plate portion 214B which connects end portions of the pair of side wall portions 214S at radially inner side thereof.

In other words, a groove portion is formed in the seal holder 214, opening outward in the circumferential direction (top side in FIG. 17).

The radially outer-side end portions of the side wall portions 214S are provided with protrusions 214A which protrude inward in the seal holder 214, extending in the circumferential direction thereof, and fit with the fitting grooves 213A of the inner shroud portions 213.

As shown in FIGS. 16 and 17, the springs 215 are elastic members that bias the inner shroud portions 213 in directions that separate them from the seal holder 214. Furthermore, by sliding on the inner shroud portions 213, the springs 215 damp the vibrations in the stator blades 210, i.e., the airfoil portions 212, and the inner should portions 213.

In this way, by having the springs 215 bias the inner shroud portions 213 in the directions that separate them from the seal holder 214, the fitting grooves 213A and the protrusions 214A are pressed together, coming into close contact with each other, thereby making it possible to ensure the sealing level between the inner shroud portions 213 and the seal holder 214.

The springs 215 are substantially rectangularly formed plate springs that are formed into substantially a wave shape, and the spring force of the springs 215 is adjusted by adjusting the plate thickness of the plate springs. With regard to the material forming the springs 215, the material is desirably capable of maintaining the required spring properties while the gas turbine 1 is in operation, that is, even if the springs 215 are heated to high temperature.

The springs 215 are disposed in a space formed between the inner shroud portions 213 and the seal holder 214, more specifically, between the inner shroud portions 213 and the seal holder 214. Furthermore, a total of two springs 215, one on the leading edge LE side and another on the trailing edge TE side, are disposed in a parallel arrangement.

In this embodiment, descriptions will be given as applied to an example in which these two springs 215 are disposed at the same phase, in other words, an example in which peak portions of the two springs 215 come in contact with the inner shroud portions 213 or the seal holder 214 at the same positions.

Figure 18:
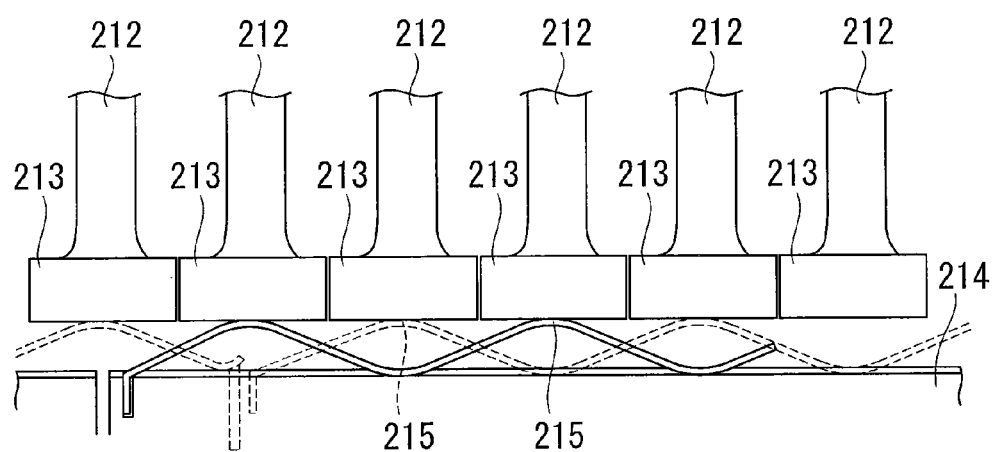
FIG. 18 is a schematic diagram for explaining another arrangement example of springs in FIG. 17.

FIG. 18 is a schematic diagram for explaining another arrangement example of springs in FIG. 17.

Note that, the two springs 215 may be disposed at the same phase, as described above, or they may be disposed at different phases, as shown in FIG. 18; it is not particularly limited.

With the arrangement of the springs 215 shown in FIG. 18, at locations where the peak portions of the first spring 215 are in contact with the inner shroud portions 213, the peak portions of the other spring 215 are in contact with the seal holder 214.

By doing so, it is possible to make the springs 215 contact all of the inner shroud portions 213, even when arrangement intervals of the peak portions in the first spring 215 are wider than arrangement intervals of the inner shroud portions 213. That is, the inner shroud portions 213 with which the peak portions of the first spring 215 are not in contact are in contact with the peak portions of the other spring 215, thereby making it possible to have all of the inner shroud portions 213 in contact with the springs 215.

The shapes of the springs 215 are determined such that the amplitude of the wave shape (peak-to-peak distance in the radial direction) is longer than the distance from the inner circumferential surfaces of the inner shroud portions 213 to the outer circumferential surface of the seal holder 214 and so that the peak portions of the springs 215 are in contact with the inner circumferential surfaces of individual inner shroud portions 213.

More specifically, the amplitude of the wave shape in the springs 215 is determined on the basis of the frictional force for damping the vibrations of the stator blades 210, that is, the compression level of the springs 215 required for generating the spring force. The wavelength (peak-to-peak distance in the circumferential direction) in the wave shape of the springs 215 is determined on the basis of the arrangement intervals of the inner shroud portions 213, that is, the stator blade's pitch.

As shown in FIG. 17, the honeycomb seal 217, together with seal fins 222 provided in the rotor 21, suppresses leakage of a fluid that flows between the stator blades 210 and the rotor 21.

Any known honeycomb seal may be used as the honeycomb seal 217; it is not particularly limited.

Next, a method of damping vibrations in the stator blades 210 having the above-described configuration will be described.

When the gas turbine 1 is operated, vibrations are generated in the stator blades 210 due to the influence of the fluid or the like flowing in the compressor 2. More specifically, vibrations are energized by which the airfoil portions 212 and the inner shroud portions 213 of the stator blades 210 vibrate in the circumferential direction.

When the inner shroud portions 213 vibrate as described above, sliding occurs between the peak portions of the springs 215, which are pressed against the inner shroud portions 213, and the inner circumferential surfaces of the inner shroud portions 213. The pressing force of the springs 215 and the frictional force in accordance with the friction coefficient between the inner shroud portions 213 and the springs 215 act between the inner shroud portions 213 and the springs 215.

The above-described sliding converts vibrational energy of the airfoil portions 212 and the inner shroud portions 213 into thermal energy, such as frictional energy and so forth, thereby damping the vibrations in the stator blades 210.

With the above-described configuration, when the airfoil portions 212 and the inner shroud portions 213 vibrate and slide relative to the seal holder 214, the springs 215 and the inner shroud portions 213 relatively move; that is, the springs 215 and the inner shroud portions 213 slide. Accordingly, energy associated with the vibrations in the airfoil portions 212 and the inner shroud portions 213 is converted into thermal energy (frictional energy) due to the sliding, thereby making it possible to damp the vibrations in the airfoil portions 212 and the inner shroud portions 213.

On the other hand, the springs 215 can be easily replaced by attaching/detaching the springs 215, together with the seal holder 214, to/from the inner shroud portions 213 by sliding them. Accordingly, even if the springs 215 become deteriorated due to wear from long-term use, the springs 215 can easily be replaced.

In addition, the springs 215 are disposed inside the space surrounded by the seal holder 214 and the inner shroud portions 213; therefore, even if the springs 215 break, it is possible to prevent them from leaping out of the space to damage the airfoil portions 212.

Because the inner shroud portions 213 are independently disposed for each of the plurality of the airfoil portions 212, the individual airfoil portions 212 and the inner shroud portions 213 readily move relative to the springs 215, as compared with the case in which the plurality of the inner shroud portions 213 are integrally formed. In other words, the sliding distance between the inner shroud portions 213 and the springs 215 is extended.

Accordingly, a greater amount of energy associated with the vibrations in the airfoil portions 212 and the inner shroud portions 213 is converted into thermal energy (frictional energy) due to sliding, and therefore, greater damping of the vibrations in the airfoil portions 212 and the inner shroud portions 213 is possible.

Figure 19:
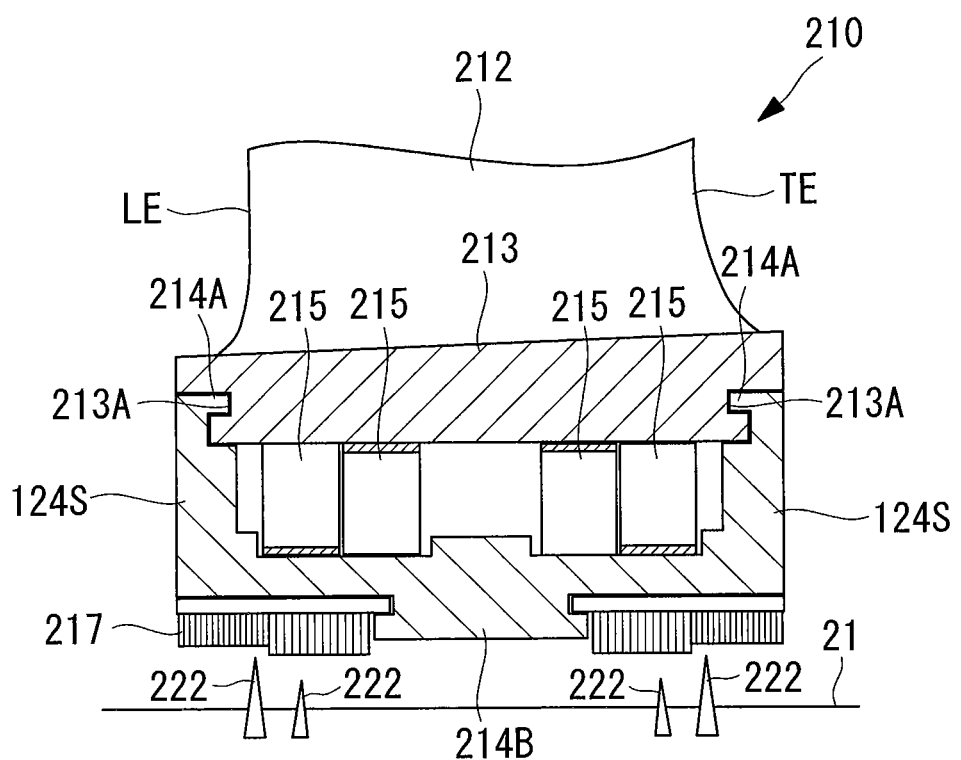
FIG. 19 is a schematic diagram for explaining yet another arrangement example of the springs in FIG. 17.

FIG. 19 is a schematic diagram for explaining yet another arrangement example of the springs in FIG. 17.

Note that, two springs 215 may be disposed between the inner shroud portions 213 and the seal holder 214, as in the embodiment described above, or, as shown in FIG. 19, four springs 215 may be disposed between the inner shroud portions 213 and the seal holder 214; the number of the springs 215 is not particularly limited.

Note that, the technical scope of the present invention is not limited to the embodiments described above, and various alterations are permissible within a range that does not depart from the gist of the present invention.

For example, in the above-described embodiments, turbine blades of this invention have been described as applied to stator blades of a gas turbine compressor; however, application to stator blades of a turbine unit of a gas turbine is also possible.

REFERENCE SIGNS LIST 1 gas turbine
10, 110, 210 stator blade (turbine blade)
12, 112, 212 airfoil portion
13, 113, 213 inner shroud portion (shroud portion)
14, 114, 214 seal holder (holder casing)
15, 115, 215 spring (elastic portion)
16 spacer (pressing portion)
18 compressing bolt (compressing portion)
116 damping plate (friction portion)
116G relief groove
118 compressing bolt (compressing portion)
119 nut (compressing portion)

The invention claimed is:

1. A turbine blade comprising:
a shroud portion disposed at an end portion of an airfoil portion;
a holder casing that can slide relative to the shroud portion, that can also be attached thereto or detached therefrom, and that forms a space with the shroud portion therebetween;
an elastic portion that is disposed in the space, biases the shroud portion in a direction that separates it from the holder casing, and is disposed in a movable manner relative to the shroud portion, and
a pressing portion that is disposed between the elastic portion and the holder casing and that can be moved toward and away from the shroud portion.

2. A turbine blade according to claim 1, wherein the shroud portion is independently disposed for each of a plurality of the airfoil portions, and,
for a plurality of the shroud portions, a single holder casing is configured in an attachable or detachable manner.

3. A turbine blade according to claim 1, wherein the elastic portion extends parallel to the direction in which the plurality of the shroud portions form a row and is a plate-like spring formed in substantially a wave shape, and
peak portions of the plate spring are in contact with the shroud portion or the holder casing.

4. A turbine blade according to claim 1, wherein a single pressing portion is disposed in the space formed by the plurality of the shroud portions and the single holder casing.

5. A turbine blade according to claim 1, wherein the elastic portion extends parallel to the direction in which the plurality of the shroud portions form a row and is a waved plate-like spring or a spring formed other functionable shape, and
peak portions of the spring are in contact with the shroud portions or the pressing casing.

6. A turbine blade according to claim 5, wherein a plurality of the springs are disposed in substantially parallel rows and, relative to peak portions of a first spring, peak portions of the other spring are disposed shifted therefrom.

7. A turbine blade according to claim 1, wherein the pressing portion is provided with a compressing portion that compresses the elastic portion by moving the pressing portion closer to the shroud portion.

8. A gas turbine provided with the turbine blade according to claim 1.

9. A turbine blade according to claim 1, further comprising:
a compressing portion that makes the pressure portion move closer to the shroud portion so as to adjust a compression level of the elastic portion.

10. A turbine blade comprising:
a shroud portion disposed at an end portion of an airfoil portion;
a holder casing that can be moved by sliding relative to the shroud portion, that can also be attached thereto/detached therefrom, and that forms a space with the shroud portions therebetween;
an elastic portion that is disposed in the space, and that biases the shroud portion in a direction that separates it from the holder casing; and
a friction portion that is disposed between the elastic portion and the shroud portion, that can be moved closer to or away from the shroud portion, and that is disposed in a movable manner relative to the shroud portion.

11. A turbine blade according to claim 10, wherein the shroud portion is independently disposed for each of a plurality of the airfoil portions;
for a plurality of the shroud portions, a single holder casing is configured in a attachable or detachable manner; and
in the space formed by the plurality of the shroud portions and the single holder casing, a single friction portion is disposed for a single shroud portion.

12. A turbine blade according to claim 10, wherein the elastic portion extends parallel to the direction in which the plurality of the shroud portions form a row and is a plate-like spring formed in substantially a wave shape, and
peak portions of the spring are in contact with the friction portion or the holder casing.

13. A turbine blade according to claim 12,
wherein a plurality of the springs are disposed in substantially parallel rows and, relative to peak portions of a first spring, peak portions of the other spring are disposed shifted therefrom.

14. A turbine blade according to claim 10, wherein the friction portion is provided with a compressing portion that extends from the friction portion toward the holder casing, protrudes so as to penetrate the holder casing, and compresses the elastic portion by moving the friction portion closer to the holder casing.

15. A turbine blade according to claim 10, wherein a relief groove that extends in a direction that intersects with the direction into which the holder casing slides is provided at a surface where the friction portion comes in contact with the shroud portion.

16. A gas turbine provided with the turbine blade according to claim 10.

17. A turbine blade according to claim 10, further comprising:
a compressing portion that makes the friction portion move closer to the holder casing so as to adjust a compression level of the elastic portion.

18. A turbine blade, comprising:
a shroud portion disposed at an end portion of an airfoil portion;
a holder casing that can slide relative to the shroud portion, that can also be attached thereto or detached therefrom, and that forms a space with the shroud portion therebetween; and
an elastic portion that is disposed in the space, biases the shroud portion in a direction that separates it from the holder casing, and is disposed in a movable manner relative to the shroud portion,
wherein
the elastic portion extends parallel to the direction in which a plurality of the shroud portions form a row and is a plate-like spring formed in substantially a wave shape,
peak portions of the spring are in contact with the shroud portion or the holder casing, and
a plurality of the springs are disposed in substantially parallel rows and, relative to peak portions of a first spring, peak portions of the other spring are disposed shifted therefrom.

19. A turbine blade according to claim 18,
wherein the shroud portion is independently disposed for each of a plurality of the airfoil portions, and,
for the plurality of the shroud portions, a single holder casing is configured in an attachable or detachable manner.

20. A gas turbine provided with the turbine blade according to claim 18.

21. A method of damping vibration comprising:
a sliding-occurring step of, when shroud portions each disposed at an end portion of an airfoil portion vibrate, having sliding occur between peak portions of an elastic portion, which are pressed against the shroud portions, and the shroud portions; and an energy-converting step of converting, by the sliding having occurred in the sliding- occurring step, vibrational energy of the vibration into frictional energy that occurs between the shroud portions and the elastic portion, wherein the elastic portion extends parallel to the direction in which a plurality of the shroud portions form a row and is a plurality of plate-like springs each formed in substantially a wave shape, and wherein the shroud portions with which the peak portions of a first spring are not in contact are in contact with the peak portions of the other spring, whereby all of the shroud portions are in contact with the springs.

* * * * *